United States Patent
Mikura et al.

(10) Patent No.: US 10,188,910 B2
(45) Date of Patent: Jan. 29, 2019

(54) GOLF BALL

(71) Applicant: Dunlop Sports Co. Ltd., Kobe-shi, Hyogo (JP)

(72) Inventors: Chiemi Mikura, Kobe (JP); Kazuyoshi Shiga, Kobe (JP); Hikaru Nagakura, Kobe (JP); Ryota Sakamine, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/782,069

(22) Filed: Oct. 12, 2017

(65) Prior Publication Data
US 2018/0126226 A1    May 10, 2018

(30) Foreign Application Priority Data
Nov. 4, 2016  (JP) .................... 2016-216769

(51) Int. Cl.
*A63B 37/06* (2006.01)
*A63B 37/00* (2006.01)
*C08K 5/09* (2006.01)

(52) U.S. Cl.
CPC ........ *A63B 37/0074* (2013.01); *A63B 37/003* (2013.01); *A63B 37/0031* (2013.01);
(Continued)

(58) Field of Classification Search
CPC ................................................ A63B 37/0062
(Continued)

(56) References Cited

U.S. PATENT DOCUMENTS 9,364,721 B2 * 6/2016 Nakajima .......... A63B 37/0063
2011/0250991 A1 10/2011 Isogawa et al.
2013/0296072 A1 11/2013 Nakajima et al.

FOREIGN PATENT DOCUMENTS

JP    2011-217857 A    11/2011
JP    2013-230365 A    11/2013
JP    2015-77405 A     4/2015

* cited by examiner

*Primary Examiner* — Raeann Gorden
(74) *Attorney, Agent, or Firm* — Birch, Stewart, Kolasch & Birch, LLP

(57) ABSTRACT

An object of the present invention is to provide a golf ball having an excellent flight performance on driver shots. The present invention provides a golf ball comprising a spherical core and at least one cover covering the spherical core, wherein a hardness difference D1 (H75–H0) between a hardness H75 at a point located at a distance of 75% of a core radius from a center of the spherical core and a center hardness H0 of the spherical core is 15 or more and 35 or less in Shore C hardness, a hardness difference D2 (Hs–H75) between a surface hardness Hs of the spherical core and the hardness H75 at the point located at the distance of 75% of the core radius from the center of the spherical core is −1 or more and 3.5 or less in Shore C hardness, and a hardness difference D3 ((H0+H75)/2–H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness.

18 Claims, 1 Drawing Sheet

(52) U.S. Cl.
CPC ...... *A63B 37/0051* (2013.01); *A63B 37/0063* (2013.01); *A63B 37/0092* (2013.01); *A63B 37/0096* (2013.01); *C08K 5/09* (2013.01)

(58) Field of Classification Search
USPC .......................................................... 473/371
See application file for complete search history.

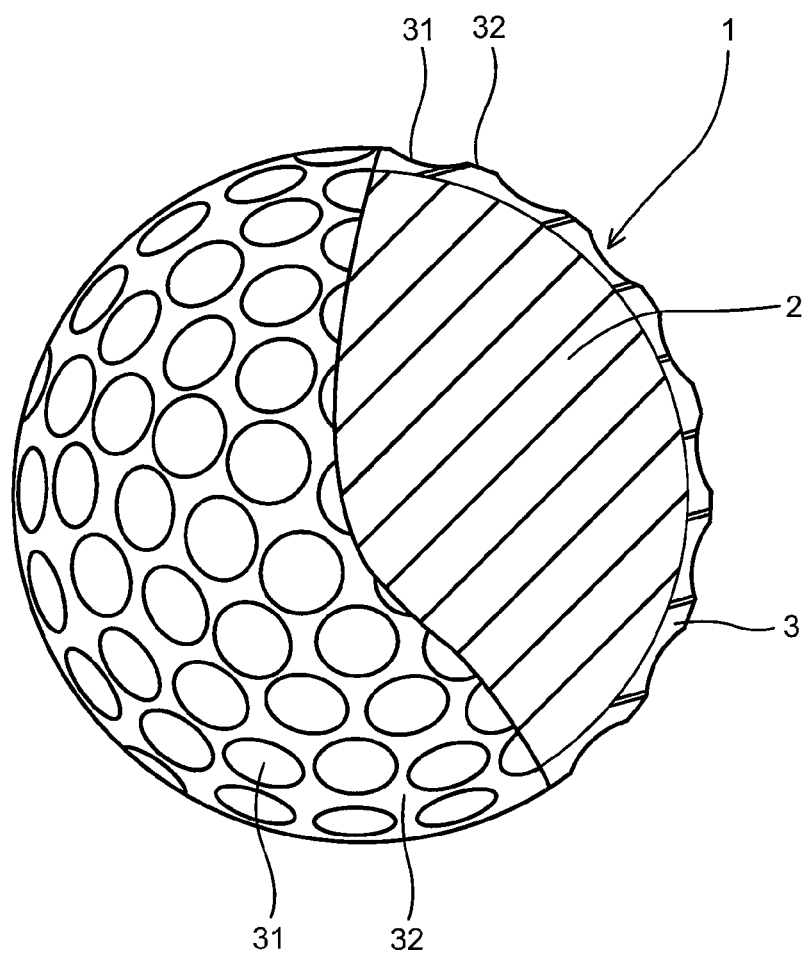

GOLF BALL

FIELD OF THE INVENTION

The present invention relates to a golf ball having an excellent flight performance, more specifically, relates to an improvement of a core of a golf ball.

DESCRIPTION OF THE RELATED ART

As a method for increasing a flight distance of a golf ball on driver shots, for example, there are a method of using a core having a high resilience and a method of using a core having a hardness distribution in which the hardness increases from the core center toward the core surface. The former method has an effect of enhancing a golf ball initial speed, and the latter method has an effect of a higher launch angle and a lower spin rate. A golf ball having a higher launch angle and a lower spin rate travels a greater flight distance.

In order to increase the flight distance of a golf ball, various studies focusing on the hardness distribution of a core have been carried out. For example, Japanese Patent Publication No. 2011-217857 A discloses a golf ball, wherein a difference between a JIS-C hardness H (5.0) at a point located at a distance of 5 mm from a central point of the core and a JIS-C hardness Ho at the central point of the core is 6.0 or more, a difference between a JIS-C hardness H (12.5) at a point located at a distance of 12.5 mm from the central point of the core and the JIS-C hardness H (5.0) is 4.0 or less, a difference between a JIS-C hardness HS at a surface of the core and the JIS-C hardness H (12.5) is 10.0 or more, a difference between the hardness HS and the hardness Ho is 22.0 or more, and there is no zone in which a hardness decreases from the central point toward the surface.

Japanese Patent Publication No. 2013-230365 A discloses a golf ball comprising a core and at least one cover layer, wherein (1) H−14<70, (2) H−8<72, (3) H−6<75 and (4) H−4−H−8>8 are satisfied when a JIS-C hardness at a position of 14 mm inward from a surface of the core toward a center of the core is adopted as (H−14), a JIS-C hardness at a position of 8 mm inward from a surface of the core toward a center of the core is adopted as (H−8), a JIS-C hardness at a position of 6 mm inward from a surface of the core toward a center of the core is adopted as (H−6), and a JIS-C hardness at a position of 4 mm inward from a surface of the core toward a center of the core is adopted as (H−4) in a cross-sectional hardness of the core.

Japanese Patent Publication No. 2015-77405 A discloses a golf ball comprising a core and at least one cover layer, wherein (1) D−C≥7, (2) C−B≤7, (3) (D−C)−(C−B)≥7 and (4) E−A≥16 are satisfied when a radius of the core is adopted as R (mm), a JIS-C hardness at a central point of the core is adopted as A, a JIS-C hardness at a position having a distance of R/3 mm from the central point of the core is adopted as B, a JIS-C hardness at a position having a distance of R/1.8 mm from the central point of the core is adopted as C, a JIS-C hardness at a position having a distance of R/1.3 mm from the central point of the core is adopted as D, and a JIS-C hardness at a surface of the core is adopted as E in a cross-sectional hardness of the core.

SUMMARY OF THE INVENTION

An object of the present invention is to provide a golf ball having an excellent flight performance.

The present invention provides a golf ball comprising a spherical core and at least one cover covering the spherical core, wherein a hardness difference D1 (H75−H0) between a hardness H75 at a point located at a distance of 75% of a core radius from a center of the spherical core and a center hardness H0 of the spherical core is 15 or more and 35 or less in Shore C hardness, a hardness difference D2 (Hs−H75) between a surface hardness Hs of the spherical core and the hardness H75 at the point located at the distance of 75% of the core radius from the center of the spherical core is −1 or more and 3.5 or less in Shore C hardness, and a hardness difference D3 ((H0+H75)/2−H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness. The golf ball having the above construction according to the present invention shows a high resilience and a spin rate.

The present invention provides a golf ball having an excellent flight performance.

BRIEF DESCRIPTION OF THE DRAWINGS

The FIGURE is a partially cutaway sectional view showing a golf ball according to an embodiment of the present invention.

DESCRIPTION OF THE PREFERRED EMBODIMENT

The present invention provides a golf ball comprising a spherical core and at least one cover covering the spherical core, wherein a hardness difference D1 (H75−H0) between a hardness H75 at a point located at a distance of 75% of a core radius from a center of the spherical core and a center hardness H0 of the spherical core is 15 or more and 35 or less in Shore C hardness, a hardness difference D2 (Hs−H75) between a surface hardness Hs of the spherical core and the hardness H75 at the point located at the distance of 75% of the core radius from the center of the spherical core is −1 or more and 3.5 or less in Shore C hardness, and a hardness difference D3 ((H0+H75)/2−H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness.

The hardness difference D1 (H75−H0) between the hardness H75 at the point located at the distance of 75% of the core radius from the center of the spherical core and the center hardness H0 of the spherical core is preferably 15 or more, more preferably 17.0 or more, and even more preferably 19.0 or more in Shore C hardness, and is preferably 35 or less, more preferably 34.0 or less, and even more preferably 33.0 or less in Shore C hardness. If the hardness difference D1 falls within the above range, the entire spherical core becomes an outer-hard inner-soft construction. A golf ball comprising the spherical core having an outer-hard inner-soft construction shows a low spin rate under a high launch angle, and the golf ball showing a low spin rate and a high launch angle travels a great flight distance.

The hardness difference D2 (Hs−H75) between the surface hardness Hs of the spherical core and the hardness H75 at the point located at the distance of 75% of the core radius from the center of the spherical core is preferably −1 or more, more preferably −0.5 or more, and even more preferably 0 or more in Shore C hardness, and is preferably 3.5 or less, more preferably 3.0 or less, and even more preferably 2.5 or less in Shore C hardness. If the hardness difference D2 falls within the above range, the spherical core has a larger coefficient of restitution. A golf ball having a high coefficient of restitution travels a great flight distance.

The hardness difference D3 ((H0+H75)/2−H37.5) between the hardness of (the center hardness H0 of the spherical core+the hardness H75 at the point located at the distance of 75% of the core radius from the center of the spherical core)/2 and the hardness H37.5 at the point located at the distance of 37.5% of the core radius from the center of the spherical core is preferably 0.5 or more, more preferably 0.7 or more, and even more preferably 0.9 or more in Shore C hardness, and is preferably 6.5 or less, more preferably 6.0 or less, and even more preferably 5.5 or less in Shore C hardness. If the hardness difference D3 falls within the above range, the spherical core has a larger coefficient of restitution. A golf ball having a high coefficient of restitution travels a great flight distance.

A hardness difference D4 (H50−H0) between a hardness H50 at a point located at a distance of 50% of the core radius from the center of the spherical core and the center hardness H0 of the spherical core is preferably 9.5 or more, more preferably 9.7 or more, and even more preferably 9.9 or more in Shore C hardness, and is preferably 17.0 or less, more preferably 16.0 or less, and even more preferably 15.0 or less in Shore C hardness.

A hardness difference D5 (H75−H50) between the hardness H75 at the point located at the distance of 75% of the core radius from the center of the spherical core and the hardness H50 at the point located at the distance of 50% of the core radius from the center of the spherical core is preferably 10 or more, more preferably 11.0 or more, and even more preferably 12.0 or more in Shore C hardness, and is preferably 23.0 or less, more preferably 21.0 or less, and even more preferably 19.0 or less in Shore C hardness. If the hardness difference D5 falls within the above range, the golf ball shows a low spin rate and a high launch angle.

A ratio (D2/D1) of the hardness difference D2 (Hs−H75) between the surface hardness Hs of the spherical core and the hardness H75 at the point located at the distance of 75% of the core radius from the center of the spherical core to the hardness difference D1 (H75−H0) between the hardness H75 at the point located at the distance of 75% of the core radius from the center of the spherical core and the center hardness H0 of the spherical core is preferably 0.3 or less, more preferably 0.2 or less, and even more preferably 0.1 or less, and is preferably −0.05 or more, more preferably −0.03 or more.

The spherical core of the golf ball according to the present invention is preferably formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, (d) an unsaturated fatty acid and/or a metal salt thereof excluding an α,β-unsaturated carboxylic acid having 3 to 8 carbon atoms and/or a metal salt thereof, and (e1) a saturated aliphatic carboxylic acid and/or a metal salt thereof and/or (e2) an aromatic carboxylic acid and/or a metal salt thereof.

[(a) Base Rubber]

As (a) the base rubber, a natural rubber and/or a synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely or in combination of at least two of them. Among them, typically preferred is a high-cis polybutadiene having a cis-1,4 bond in a proportion of 40 mass % or more, preferably 80 mass % or more, and more preferably 90 mass % or more in view of its superior resilience property.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-Crosslinking Agent]

(b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition further contains (f) a metal compound as an essential component. This is because neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent. Further, in case of using the α,β-unsaturated carboxylic acid having 3 to 8 carbon atoms and the metal salt thereof in combination as the co-crosslinking agent, (f) the metal compound may be used as an optional component.

Examples of the α,β-unsaturated carboxylic acid having 3 to 8 carbon atoms include acrylic acid, methacrylic acid, fumaric acid, maleic acid, crotonic acid, and the like.

Examples of the metal constituting the metal salt of the α,β-unsaturated carboxylic acid having 3 to 8 carbon atoms include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the constituting member formed from the rubber composition, which tends to lower the resilience of the golf ball. On the other hand, if the amount of the α,β-unsaturated carboxylic acid having 3 to 8 carbon atoms and/or the metal salt thereof exceeds 50 parts by mass, the constituting member formed from the rubber composition becomes so hard that the shot feeling of the golf ball may be lowered.

[(c) Crosslinking Initiator]

(c) The crosslinking initiator is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, di-t-butylperoxide or the like. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of (c) the crosslinking initiator is less than 0.2 part by mass, the constituting member formed from the rubber composition becomes so soft that the resilience of the golf ball may be lowered. If the amount of (c) the crosslinking initiator exceeds 5.0 parts by mass, the amount of (b) the co-crosslinking agent which has been explained above must be decreased in order to obtain an appropriate hardness of the constituting member formed from the rubber composition, which may lower the resilience of the golf ball or worsen the durability of the golf ball.

[(d) Unsaturated Fatty Acid and/or Metal Salt Thereof]

(d) The unsaturated fatty acid and/or the metal salt thereof is an aliphatic monocarboxylic acid having at least one unsaturated bond in the hydrocarbon chain and/or a metal salt thereof. It is noted that (d) the unsaturated fatty acid and/or the metal salt thereof excludes (b) the α,β-unsaturated carboxylic acid having 3 to 8 carbon atoms and/or the metal salt thereof used as the co-crosslinking agent.

The amount of the carbon-carbon double bond per unit mass of (d) the unsaturated fatty acid and/or the metal salt thereof is preferably 1.00 mmol/g or more, more preferably 1.50 mmol/g or more, and even more preferably 2.00 mmol/g or more, and is preferably 10.00 mmol/g or less, more preferably 9.00 mmol/g or less, and even more preferably 8.00 mmol/g or less. If the amount of the carbon-carbon double bond per unit mass of the component (d) is 1.00 mmol/g or more, the addition reaction between the component (d) and the component (b) occurs more easily, and thus the obtained spherical core has a higher resilience. If the amount of the carbon-carbon double bond per unit mass of the component (d) is 10.00 mmol/g or less, the obtained spherical core has a higher resilience.

A ratio (component (d)/component (b)) of a total of mole numbers of the carbon-carbon double bond in (d) the unsaturated fatty acid and/or the metal salt thereof to a total of mole numbers of the carbon-carbon double bond in (b) the α,β-unsaturated carboxylic acid having 3 to 8 carbon atoms and/or the metal salt thereof is preferably 0.01 or more, more preferably 0.02 or more, and even more preferably 0.03 or more, and is preferably 0.20 or less, more preferably 0.18 or less. If the ratio (component (d)/component (b)) is 0.01 or more, the addition reaction between the component (d) and the component (b) occurs more easily, and thus the obtained spherical core has a higher resilience. On the other hand, if the ratio (component (d)/component (b)) is 0.20 or less, the durability of the golf ball is maintained without changing the compression deformation amount of the spherical core.

(d) The unsaturated fatty acid and/or the metal salt thereof preferably has 4 or more carbon atoms, more preferably 5 or more carbon atoms, even more preferably 8 or more carbon atoms, and most preferably 12 or more carbon atoms, and preferably has 33 or less carbon atoms, more preferably 30 or less carbon atoms, and even more preferably 26 or less carbon atoms. If the component (d) is an unsaturated fatty acid having 33 or less carbon atoms and/or a metal salt thereof, the addition reaction between the component (d) and the component (b) occurs more easily, and thus the obtained spherical core has a higher resilience.

In the case that (d) the unsaturated fatty acid and/or the metal salt thereof is an unsaturated fatty acid having 5 or more carbon atoms and/or a metal salt thereof, (d) the unsaturated fatty acid and/or the metal salt thereof preferably has the first carbon-carbon double bond at the first or later carbon, more preferably at the second or later carbon, and even more preferably at the third or later carbon, counted from the carboxyl group side thereof. If the component (d) is an unsaturated fatty acid having the first carbon-carbon double bond at the carbon in the above range and/or a metal salt thereof, the addition reaction between the component (d) and the component (b) occurs more easily, and thus the obtained spherical core has a higher resilience.

(d) The unsaturated fatty acid and/or the metal salt thereof is preferably an unsaturated fatty acid represented by the chemical formula (1) and/or a metal salt thereof.

[Chemical formula 1]

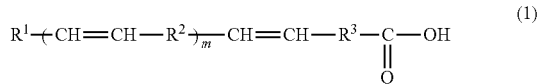

(1)

In the chemical formula (1), $R^1$ represents a hydrogen atom or an alkyl group having 1 to 25 carbon atoms, $R^2$ represents an alkylene group having 1 to 25 carbon atoms, $R^3$ represents an alkylene group having 2 to 25 carbon atoms, and m represents a natural number ranging from 0 to 5, and when m ranges from 2 to 5, multiple $R^2$ may be identical to or different from each other.

The alkyl group having 1 to 25 carbon atoms represented by $R^1$ may have a branched structure or a cyclic structure, but is preferably a linear alkyl group. The alkyl group $R^1$ preferably has 1 or more carbon atoms, more preferably 3 or more carbon atoms, and even more preferably 5 or more carbon atoms, and preferably has 25 or less carbon atoms, more preferably 23 or less carbon atoms, and even more preferably 21 or less carbon atoms.

The alkylene group having 1 to 25 carbon atoms represented by $R^2$ may have a branched structure or a cyclic structure, but is preferably a linear alkylene group. The alkylene group $R^2$ preferably has 1 or more carbon atoms, more preferably 3 or more carbon atoms, and even more preferably 5 or more carbon atoms, and preferably has 25 or less carbon atoms, more preferably 23 or less carbon atoms, and even more preferably 21 or less carbon atoms.

The alkylene group having 2 to 25 carbon atoms represented by $R^3$ may have a branched structure or a cyclic structure, but is preferably a linear alkylene group. The alkylene group $R^3$ preferably has 2 or more carbon atoms, more preferably 3 or more carbon atoms, and even more preferably 4 or more carbon atoms, and preferably has 25 or less carbon atoms, more preferably 23 or less carbon atoms, and even more preferably 21 or less carbon atoms.

The above m is preferably 3 or less, more preferably 2 or less, even more preferably 1 or less, and most preferably 0.

As the compound represented by the chemical formula (1), a compound represented by the following chemical formula (2) or chemical formula (3) is more preferred.

[Chemical formula 2]

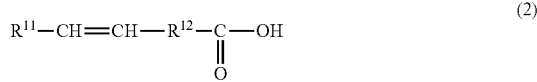

(2)

In the chemical formula (2), $R^{11}$ represents a hydrogen atom or an alkyl group having 1 to 25 carbon atoms, and $R^{12}$ represents an alkylene group having 2 to 25 carbon atoms.

The alkyl group having 1 to 25 carbon atoms represented by $R^{11}$ may have a branched structure or a cyclic structure, but is preferably a linear alkyl group. The alkylene group having 2 to 25 carbon atoms represented by $R^{12}$ may have a branched structure or a cyclic structure, but is preferably a linear alkylene group.

In the chemical formula (2), in the case that $R^{11}$ is an alkyl group, a ratio ($R^{11}/R^{12}$) of carbon atom number in $R^{11}$ to carbon atom number in $R^{12}$ is preferably 0.1 or more, more preferably 0.5 or more, and even more preferably 0.8 or more, and is preferably 10.0 or less, more preferably 5.0 or less, and even more preferably 1.3 or less. If the ratio ($R^{11}/R^{12}$) of carbon atom number falls within the above range, the obtained spherical core has a higher resilience.

[Chemical formula 3]

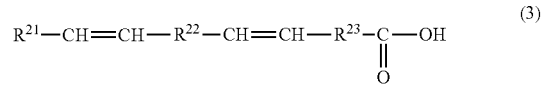

(3)

In the chemical formula (3), $R^{21}$ represents a hydrogen atom or an alkyl group having 1 to 25 carbon atoms, $R^{22}$ represents an alkylene group having 1 to 25 carbon atoms, and $R^{23}$ represents an alkylene group having 2 to 25 carbon atoms.

The alkyl group having 1 to 25 carbon atoms represented by $R^{21}$ may have a branched structure or a cyclic structure, but is preferably a linear alkyl group. The alkylene group having 1 to 25 carbon atoms represented by $R^{22}$ may have a branched structure or a cyclic structure, but is preferably a linear alkylene group. The alkylene group having 2 to 25 carbon atoms represented by $R^{23}$ may have a branched structure or a cyclic structure, but is preferably a linear alkylene group.

The alkylene group represented by $R^{22}$ preferably has 25 or less carbon atoms, more preferably 20 or less carbon atoms, and even more preferably 15 or less carbon atoms. As the alkylene group represented by $R^{22}$, a methylene group and an ethylene group are preferred, a methylene group is more preferred.

In the chemical formula (3), in the case that $R^{21}$ is an alkyl group, a ratio ($R^{21}/R^{23}$) of carbon atom number in $R^{21}$ to carbon atom number in $R^{23}$ is preferably 0.1 or more, more preferably 0.5 or more, and even more preferably 0.8 or more, and is preferably 10.0 or less, more preferably 5.0 or less, and even more preferably 1.3 or less. If the ratio ($R^{21}/R^{23}$) of carbon atom number falls within the above range, the obtained spherical core has a higher resilience.

(d) The unsaturated fatty acid and/or the metal salt thereof is preferably a linear unsaturated fatty acid and/or a metal salt thereof. Examples of (d) the unsaturated fatty acid and/or the metal salt thereof include an unsaturated fatty acid having a carbon-carbon double bond at the terminal of the hydrocarbon chain and/or a metal salt thereof, an unsaturated fatty acid having at least one trans-isomerized carbon-carbon double bond and/or a metal salt thereof, and an unsaturated fatty acid having at least one cis-isomerized carbon-carbon double bond and/or a metal salt thereof. As (d) the unsaturated fatty acid and/or the metal salt thereof, the unsaturated fatty acid having at least one cis-isomerized carbon-carbon double bond and/or the metal salt thereof is more preferred. If the component (d) has the above structure, the reactivity of the addition reaction between the component (d) and the component (b) is high, and thus the obtained spherical core has a higher resilience.

Specific examples of the unsaturated fatty acid constituting (d) the unsaturated fatty acid and/or the metal salt thereof include an unsaturated fatty acid having a double bond at the terminal thereof, such as 4-pentenoic acid (C5, monounsaturated fatty acid, (4)), 5-hexenoic acid (C6, monounsaturated fatty acid, (5)), 6-heptenoic acid (C7, monounsaturated fatty acid, (6)), 7-octenoic acid (C8, monounsaturated fatty acid, (7)), 8-nonenoic acid (C9, monounsaturated fatty acid, (8)), 9-decenoic acid (010, monounsaturated fatty acid, (9)), and 10-undecylenic acid (C11, monounsaturated fatty acid, (10)); and an unsaturated fatty acid having a double bond at a location other than the terminal thereof, such as myristoleic acid (C14, cis-9-monounsaturated fatty acid, (9)), palmitoleic acid (C16, cis-9-monounsaturated fatty acid, (9)), stearidonic acid (C18, 6,9,12,15-tetraunsaturated fatty acid, (6)), vaccenic acid (C18, cis-11-monounsaturated fatty acid, (11)), oleic acid (C18, cis-9-monounsaturated fatty acid, (9)), elaidic acid (C18, trans-9-monounsaturated fatty acid, (9)), linoleic acid (C18, cis-9-cis-12-diunsaturated fatty acid, (9)), α-linolenic acid (C18, 9,12,15-triunsaturated fatty acid, (9)), γ-linolenic acid (C18, 6,9,12-triunsaturated fatty acid, (6)), gadoleic acid (C20, cis-9-monounsaturated fatty acid, (9)), eicosenoic acid (C20, cis-11-monounsaturated fatty acid, (11)), eicosadienoic acid (C20, cis-11-cis-14-diunsaturated fatty acid, (11)), arachidonic acid (C20, 5,8,11,14-tetraunsaturated fatty acid, (5)), eicosapentaenoic acid (C20, 5,8,11,14,17-pentaunsaturated fatty acid, (5)), erucic acid (C22, cis-13-monounsaturated fatty acid, (13)), docosahexaenoic acid (C22, 4,7,10,13,16,19-hexaunsaturated fatty acid, (4)), and nervonic acid (C24, cis-15-monounsaturated fatty acid, (15)); and the like. It is noted that (10) or the like described in the parentheses after the compound names indicates the carbon position where the first carbon-carbon double bond is located, counted from the carboxyl group side of the unsaturated fatty acid.

Among them, preferable examples of the unsaturated fatty acid constituting (d) the unsaturated fatty acid and/or the metal salt thereof include 10-undecylenic acid, myristoleic acid, palmitoleic acid, oleic acid, linoleic acid, eicosenoic acid, erucic acid, and nervonic acid.

Examples of the metal constituting (d) the unsaturated fatty acid and/or the metal salt thereof include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred, zinc is particularly preferred.

(d) The unsaturated fatty acid and/or the metal salt thereof may be used solely or in combination of at least two of them.

The amount of (d) the unsaturated fatty acid and/or the metal salt thereof is preferably 1 part by mass or more, more preferably 2 parts by mass or more, and even more preferably 3 parts by mass or more, and is preferably 35 parts by mass or less, more preferably 30 parts by mass or less, even more preferably 25 parts by mass or less, particularly preferably 20 parts by mass or less, and most preferably 17 parts by mass or less, with respect to 100 parts by mass of (a) the base rubber. If the amount of the component (d) is 1 part by mass or more, the effect of adding the component (d) becomes greater, and thus the obtained spherical core has a higher resilience. If the amount of the component (d) is 35 parts by mass or less, the spherical core does not become excessively soft, and thus the durability and high resilience of the golf ball do not deteriorate.

[(e1) Saturated Aliphatic Carboxylic Acid and/or Metal Salt Thereof, and/or (e2) Aromatic Carboxylic Acid and/or Metal Salt Thereof]

The rubber composition further contains (e1) a saturated aliphatic carboxylic acid, and/or a metal salt thereof, and/or (e2) an aromatic carboxylic acid and/or a metal salt thereof.

If (e1) the saturated aliphatic carboxylic acid and/or the metal salt thereof, and/or (e2) the aromatic carboxylic acid and/or the metal salt thereof is contained, the obtained spherical core has a greater degree of an outer-hard and inner-soft structure. The spherical core having a greater degree of the outer-hard and inner-soft structure decreases the spin rate thereof on driver shots.

The total amount of (e1) the saturated aliphatic carboxylic acid and/or the metal salt thereof, and/or (e2) the aromatic carboxylic acid and/or the metal salt thereof is preferably 2 parts by mass or more, more preferably 3 parts by mass or more, and even more preferably 4 parts by mass or more, and is preferably 40 parts by mass or less, more preferably 30 parts by mass or less, even more preferably 20 parts by mass or less, and particularly preferably 10 parts by mass or less, with respect to 100 parts by mass of (a) the base rubber. If the total amount of (e1) the saturated aliphatic carboxylic acid and/or the metal salt thereof, and/or (e2) the aromatic carboxylic acid and/or the metal salt thereof is 2 parts by mass or more, the obtained spherical core has a greater degree of the outer-hard and inner-soft structure. If the total amount of (e1) the saturated aliphatic carboxylic acid and/or the metal salt thereof, and/or (e2) the aromatic carboxylic acid and/or the metal salt thereof is 40 parts by mass or less, plasticization of the spherical core can be suppressed.

(e1) The saturated aliphatic carboxylic acid and/or the metal salt thereof is not particularly limited, for example, the component (e1) may be either a linear saturated aliphatic carboxylic acid or a branched saturated aliphatic carboxylic acid.

The carbon number of the aliphatic carboxylic acid component constituting (e1) the saturated aliphatic carboxylic acid and/or the metal salt thereof is preferably 4 or more, more preferably 6 or more, and even more preferably 8 or more, and is preferably 30 or less, more preferably 28 or less, and even more preferably 26 or less. If the saturated aliphatic carboxylic acid and/or the metal salt thereof is used, a spherical core having a greater degree of the outer-hard and inner-soft structure is obtained.

Examples of the saturated aliphatic carboxylic acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the cation component of the saturated aliphatic carboxylic acid metal salt include a monovalent metal ion such as sodium, potassium, lithium, silver or the like; a divalent metal ion such as magnesium, calcium, zinc, barium, cadmium, copper, cobalt, nickel, manganese or the like; a trivalent metal ion such as aluminum, iron or the like; and other metal ions such as tin, zirconium, titanium or the like. The cation component may be used solely or as a mixture of at least two of them.

(e1) The saturated aliphatic carboxylic acid and/or the metal salt thereof may be used solely or in combination of at least two of them.

The amount of (e1) the saturated aliphatic carboxylic acid and/or the metal salt thereof is preferably 2 parts by mass or more, more preferably 3 parts by mass or more, and is preferably 20 parts by mass or less, more preferably 15 parts by mass or less, with respect to 100 parts by mass of (a) the base rubber. If the amount of (e1) the saturated aliphatic carboxylic acid and/or the metal salt thereof is 2 parts by mass or more, the obtained spherical core has a greater degree of the outer-hard and inner-soft structure. If the amount of (e1) the saturated aliphatic carboxylic acid and/or the metal salt thereof is 20 parts by mass or less, plasticization of the spherical core can be suppressed.

[(e2) Aromatic Carboxylic Acid and/or Metal Salt Thereof]

The aromatic carboxylic acid has an aromatic ring and a carboxy group bonding to the aromatic ring directly or via an alkylene group having 1 to 3 carbon atoms, in the molecule thereof. The aromatic carboxylic acid is preferably the one having a carboxy group directly bonding to an aromatic ring. (e2) The aromatic carboxylic acid and/or the metal salt thereof may be used solely or in combination of at least two of them.

Examples of the aromatic ring include a benzene ring, fused benzene ring and aromatic heterocycle. Examples of the fused benzene ring include naphthalene, anthracene, phenalene, phenanthrene, tetraceny, pyrene and so on. The aromatic heterocycle includes carbon atoms and at least one atom (heteroatom) other than the carbon atom as an atom constituting the cyclic structure and has aromaticity. One type or at least two types of the heteroatom may be included in the aromatic heterocycle. Examples of the heteroatom include nitrogen atom, oxygen atom, sulfur atom and so on, and among them, oxygen atom and sulfur atom are preferred. In addition, the number of the heteroatom included in the aromatic heterocycle is not particularly limited, and is preferably 2 or less, and more preferably 1. Examples of the aromatic heterocycle include a monocyclic structure such as a five-membered cyclic structure, a six-membered cyclic structure and so on; a fused cyclic structure; and so on. Among them, as the aromatic heterocycle, the monocyclic structure is preferred, and the five-membered cyclic structure is more preferred.

Examples of the aromatic heterocycle include a five-membered cyclic structure such as pyrrole, furan, thiophene, imidazole, pyrazole, oxazole, isooxazole, thiazole and so on; a six-membered cyclic structure such as pyridine, pyrazine, pyridazine, pyrimidine, triazine, tetrazine and so on; a fused cyclic structure such as indole, isoindole, benzoimidazole, quinoline, isoquinoline, quinoxaline, cinnoline, quinazoline, benzofuran, isobenzofuran, benzothiophene, benzothiazole and so on.

The number of the carboxy group included in one molecule of the aromatic carboxylic acid may be one (monocarboxylic acid) or at least two (polycarboxylic acid), and is preferably one. The aromatic ring may further include a substituent group directly bonding to the aromatic ring, in addition to the carboxy group. Examples of the substituent group include an alkyl group, aryl group, aralkyl group, alkylaryl group, optionally substituted amino group, hydroxy group, alkoxy group, halogen group, acetoxy group and so on.

Examples of the alkyl group include methyl group, ethyl group, propyl group, butyl group, pentyl group, hexyl group, heptyl group, octyl group, nonyl group, decyl group and so on, and among them, the alkyl group having 1 to 6 carbon atoms is preferred, the alkyl group having 1 to 4 carbon atoms is more preferred. Examples of the aryl group include phenyl group, naphthyl group, anthryl group, biphenyl group, phenanthryl group, fluorenyl group and so on, and among them, phenyl group is preferred. Examples of the aralkyl group include benzyl group, phenethyl group, phenylpropyl group, naphthylmethyl group, naphthylethyl group and so on. Examples of the alkylaryl group include tolyl group, xylyl group, cumenyl group, mesityl group and so on.

As the optionally substituted amino group, an amino group having at least one hydrogen atom thereof being substituted with an alkyl group or aryl group is preferred. Examples of the optionally substituted amino group include methylamino group, dimethylamino group, ethylamino group, propylamino group, isopropylamino group, butylamino group, isobutylamino group, tert-butylamino group, pentylamino group, hexylamino group, 2-ethylhexylamino group, phenylamino group, diphenylamino group, naphthyl amino group and so on.

Examples of the alkoxy group include methoxy group, ethoxy group, propoxy group, buthoxy group, pentyloxy group, hexyloxy group, heptyloxy group, octyloxy group, nonyloxy group, decyloxy group and so on, and among them, the alkoxy group having 1 to 6 carbon atoms is preferred, the alkoxy group having 1 to 4 carbon atoms is more preferred.

Examples of the halogen include fluorine, chlorine, bromine and iodine.

Specific examples of the aromatic carboxylic acid having a carboxy group directly bonding to a benzene ring include benzoic acid, phthalic acid, isophthalic acid, terephthalic acid, hemimellitic acid (benzene-1,2,3-tricarboxylic acid), trimellitic acid (benzene-1,2,4-tricarboxylic acid), trimesic acid (benzene-1,3,5-tricarboxylic acid), mellophanic acid (benzene-1,2,3,4-tetracarboxylic acid), prehnitic acid (benzene-1,2,3,5-tetracarboxylic acid), pyromellitic acid (benzene-1,2,4,5-tetracarboxylic acid), mellitic acid (benzene hexacarboxylic acid) and so on. Specific examples of the aromatic carboxylic acid having a carboxy group bonding to a benzene ring via an alkylene group include α-toluic acid (phenylacetic acid), hydroatropic acid (2-phenylpropionic acid), hydrocinnamic acid (3-phenylpropionic acid) and so on.

Further, examples of the carboxylic acid having a benzene ring substituted with an alkyl group, aryl group, amino group, hydroxy group, alkoxy group, acetoxy group or the like include toluic acid (methylbenzoic acid), xylic acid (dimethylbenzoic acid), prehnitylic acid (2,3,4-trimethylbenzoic acid), γ-isodurylic acid (2,3,5-trimethylbenzoic acid), durylic acid (2,4,5-trimethylbenzoic acid), β-isodurylic acid (2,4,6-trimethylbenzoic acid), α-isodurylic acid (3,4,5-trimethylbenzoic acid), cumic acid (4-isopropylbenzoic acid), 4-tert-butylbenzoic acid, uvitic acid (5-methylisophthalic acid), biphenyl-4-carboxylic acid, diphenic acid (biphenyl-2,2'-dicarboxylic acid), dimethylaminobenzoic acid, salicylic acid (2-hydroxybenzoic acid), anisic acid (methoxybenzoic acid), cresotinic acid (hydroxy(methyl)benzoic acid), o-homosalicylic acid (2-hydroxy-3-methylbenzoic acid), m-homosalicylic acid (2-hydroxy-4-methylbenzoic acid), p-homosalicylic acid (2-hydroxy-5-methylbenzoic acid), o-pyrocatechuic acid (2,3-dihydroxybenzoic acid), β-resorcylic acid (2,4-dihydroxybenzoic acid), γ-resorcylic acid (2,6-dihydroxybenzoic acid), protocatechuic acid (3,4-dihydroxybenzoic acid), α-resorcylic acid (3,5-dihydroxybenzoic acid), vanillic acid (4-hydroxy-3-methoxybenzoic acid), isovanillic acid (3-hydroxy-4-methoxybenzoic acid), veratrumic acid (3,4-dimethoxybenzoic acid), o-veratrumic acid (2,3-dimethoxybenzoic acid), 2,4-dimethoxybenzoic acid, orsellinic acid (2,4-dihydroxy-6-methylbenzoic acid), m-hemipic acid (4,5-dimethoxyphthalic acid), gallic acid (3,4,5-trihydroxybenzoic acid), syringic acid (4-hydroxy-3, 5-dimethoxybenzoic acid), asaronic acid (2,4,5-trimethoxybenzoic acid), mandelic acid (hydroxy(phenyl) acetic acid), vanillylmandelic acid (hydroxy(4-hydroxy-3-methoxyphenyl) acetic acid), homoanisic acid ((4-methoxyphenyl) acetic acid), homogentisic acid ((2,5-dihydroxyphenyl) acetic acid), homoprotocatechuic acid ((3,4-dihydroxyphenyl) acetic acid), homovanillic acid ((4-hydroxy-3-methoxyphenyl) acetic acid), homoisovanillic acid ((3-hydroxy-4-methoxyphenyl) acetic acid), homoveratrumic acid ((3,4-dimethoxyphenyl) acetic acid), o-homoveratrumic acid ((2,3-dimethoxyphenyl) acetic acid), homophthalic acid (2-(carboxymethyl) benzoic acid), homoisophthalic acid (3-(carboxymethyl) benzoic acid), homoterephthalic acid (4-(carboxymethyl) benzoic acid), phthalonic acid (2-(carboxycarbonyl) benzoic acid), isophthalonic acid (3-(carboxycarbonyl) benzoic acid), terephthalonic acid (4-(carboxycarbonyl) benzoic acid), atrolactic acid (2-hydroxy-2-phenylpropionic acid), tropic acid (3-hydroxy-2-phenylpropionic acid), melilotic acid (3-(2-hydroxyphenyl) propionic acid), phloretic acid (3-(4-hydroxyphenyl) propionic acid), hydrocaffeic acid (3-(3,4-dihydroxyphenyl) propionic acid), hydroferulic acid (3-(4-hydroxy-3-methoxyphenyl) propionic acid), hydroisoferulic acid (3-(3-hydroxy-4-methoxyphenyl) propionic acid), p-coumaric acid (3-(4-hydroxyphenyl) acrylic acid), umbellic acid (3-(2,4-dihydroxyphenyl) acrylic acid), caffein acid (3-(3,4-dihydroxyphenyl) acrylic acid), ferulic acid (3-(4-hydroxy-3-methoxyphenyl) acrylic acid), isoferulic acid (3-(3-hydroxy-4-methoxyphenyl) acrylic acid), and sinapinic acid (3-(4-hydroxy-3,5-dimethoxyphenyl) acrylic acid).

Examples of the aromatic carboxylic acid having a benzene ring substituted with a halogen include a carboxylic acid having at least one hydrogen atom of benzoic acid being substituted with a fluoro group, such as fluorobenzoic acid, difluorobenzoic acid, trifluorobenzoic acid, tetrafluorobenzoic acid, and pentafluorobenzoic acid; a carboxylic acid having at least one hydrogen atom of benzoic acid being substituted with a chloro group, such as chlorobenzoic acid, dichlorobenzoic acid, trichlorobenzoic acid, tetrachlorobenzoic acid, and pentachlorobenzoic acid; a carboxylic acid having at least one hydrogen atom of benzoic acid being substituted with a bromo group, such as bromobenzoic acid, dibromobenzoic acid, tribromobenzoic acid, tetrabromobenzoic acid, and pentabromobenzoic acid; and a carboxylic acid having at least one hydrogen atom of benzoic acid being substituted with an iodo group, such as iodobenzoic acid, diiodobenzoic acid, triiodobenzoic acid, tetraiodobenzoic acid, and pentaiodobenzoic acid.

The aromatic carboxylic acid having a benzene ring is preferably a compound represented by the following chemical formula (4).

[Chemical formula 4]

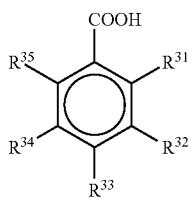

(4)

In the chemical formula (4), $R^{31}$ to $R^{35}$ independently represent a hydrogen atom, alkyl group having 1 to 4 carbon atoms, aryl group having 6 to 10 carbon atoms, optionally substituted amino group (—$NR^{a}R^{b}$ in which $R^{a}$ and $R^{b}$ independently represent a hydrogen atom, alkyl group having 1 to 4 carbon atoms, or phenyl group), hydroxy group, halogen, or acetoxy group.

Specific examples of the aromatic carboxylic acid having a carboxy group directly bonding on a fused benzene ring include 1-naphthalenecarboxylic acid, 2-naphthalenecarboxylic acid, 1-anthracenecarboxylic acid, 2-anthracenecarboxylic acid, 9-anthracenecarboxylic acid, phenanthrenecarboxylic acid, pyrenecarboxylic acid and so on. Specific examples of the aromatic carboxylic acid having a carboxy group bonding to a fused benzene ring via an alkylene group include naphthyl acetic acid, naphthyl propionic acid and so on.

Examples of the carboxylic acid having a fused benzene ring substituted with an alkyl group, aryl group, amino group, hydroxy group, alkoxy group or oxo group include 6-amino-2-naphthalenecarboxylic acid, 1,4-dihydroxy-2-naphthalenecarboxylic acid, 3,5-dihydroxy-2-naphthalenecarboxylic acid, 3,7-dihydroxy-2-naphthalenecarboxylic acid, 3-hydroxy-2-anthracenecarboxylic acid, 9,10-dihydro-9,10-dioxo-1-anthracenecarboxylic acid and so on.

Examples of the carboxylic acid having a fused benzene ring substituted with a halogen include fluoronaphthalenecarboxylic acid, chloronaphthalenecarboxylic acid, bromonaphthalenecarboxylic acid, fluoroanthracenecarboxylic acid, chloroanthracenecarboxylic acid, bromoanthracenecarboxylic acid and so on.

As the aromatic carboxylic acid having a fused benzene ring, a naphthalenecarboxylic acid having one carboxy group directly bonding to naphthalene and/or a derivative having a naphthalenecarboxylic acid structure; and an anthracenecarboxylic acid having one carboxy group directly bonding to anthracene and/or a derivative having an anthracenecarboxylic acid structure are preferred. The naphthalenecarboxylic acid and/or the derivative having the naphthalenecarboxylic acid structure is preferably a compound represented by the following chemical formulae (5-1) or (5-2). The anthracenecarboxylic acid and/or the derivative having the anthracenecarboxylic acid structure is preferably a compound represented by the following chemical formulae (6-1), (6-2) or (6-3).

[Chemical formula 5]

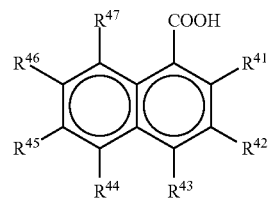

(5-1)

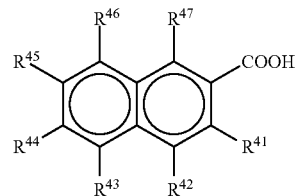

(5-2)

In the chemical formulae (5-1) and (5-2), $R^{41}$ to $R^{47}$ independently represent a hydrogen atom, alkyl group having 1 to 4 carbon atoms, aryl group having 6 to 10 carbon atoms, optionally substituted amino group (—$NR^aR^b$ in which $R^a$ and $R^b$ independently represent a hydrogen atom, alkyl group having 1 to 4 carbon atoms, or phenyl group), hydroxy group, halogen, or acetoxy group.

[Chemical formula 6]

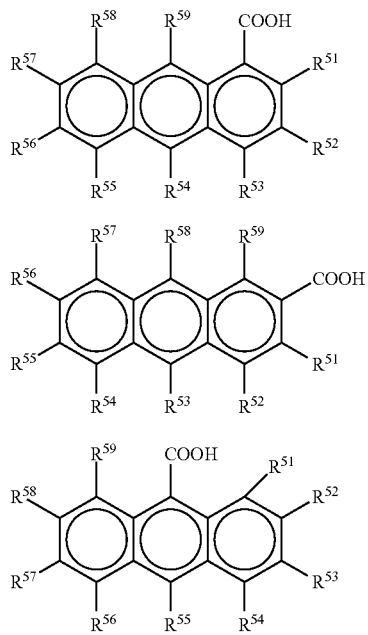

(6-1)

(6-2)

(6-3)

In the chemical formulae (6-1), (6-2) and (6-3), $R^{51}$ to $R^{59}$ independently represent a hydrogen atom, alkyl group having 1 to 4 carbon atoms, aryl group having 6 to 10 carbon atoms, optionally substituted amino group (—$NR^aR^b$ in which $R^a$ and $R^b$ independently represent a hydrogen atom, alkyl group having 1 to 4 carbon atoms, or phenyl group), hydroxy group, halogen, or acetoxy group.

Specific examples of the aromatic carboxylic acid having a carboxy group directly bonding to an aromatic heterocycle include a carboxylic acid having a five-membered heterocycle, such as pyrrolecarboxylic acid, furancarboxylic acid, thiophenecarboxylic acid (2-thenoic acid), imidazolecarboxylic acid, pyrazolecarboxylic acid, oxazolecarboxylic acid, thiazolecarboxylic acid and so on; a carboxylic acid having a six-membered heterocycle, such as pyridinecarboxylic acid, pyrazinecarboxylic acid, pyridazinecarboxylic acid, pyrimidinecarboxylic acid, triazinecarboxylic acid, tetrazinecarboxylic acid and so on; a carboxylic acid having a fused heterocycle, such as indolecarboxylic acid, isoindolecarboxylic acid, benzoimidazolecarboxylic acid, quinolinecarboxylic acid, isoquinolinecarboxylic acid, quinoxalinecarboxylic acid, cinnolinecarboxylic acid, quinazolinecarboxylic acid, benzofurancarboxylic acid, benzothiophenecarboxylic acid, benzothiazolecarboxylic acid and so on; and salts thereof. Among them, a compound having one heteroatom as a constituent atom of the aromatic heterocycle and a carboxy group bonding to the 2- or 3-position of the heterocycle relative to the heteroatom is preferred, and the carboxy group more preferably bonds to the 2-position of the heterocycle relative to the heteroatom.

In particular, the aromatic carboxylic acid having a carboxy group directly bonding to an aromatic heterocycle is preferably a compound represented by the following chemical formulae (7) or (8).

[Chemical formula 7]

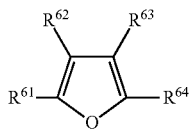

(7)

In the chemical formula (7), $R^{61}$ to $R^{64}$ are independently represent a hydrogen atom, carboxy group, halogen, hydroxy group, mercapto group, alkyl group, aryl group, aralkyl group, alkylaryl group, alkoxy group, optionally substituted amino group, cyano group or thiocarboxy group, and at least one group among $R^{61}$ to $R^{64}$ is a carboxy group.

[Chemical formula 8]

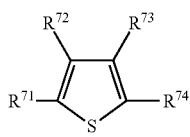

(8)

In the chemical formula (8), $R^{71}$ to $R^{74}$ independently represent a hydrogen atom, carboxy group, halogen, hydroxy group, mercapto group, alkyl group, aryl group, aralkyl group, alkylaryl group, alkoxy group, optionally substituted amino group, cyano group or thiocarboxy group, and at least one group among $R^{71}$ to $R^{74}$ is a carboxy group.

Examples of the compound represented by the chemical formula (7) include 2-furancarboxylic acid, 3-furancarboxylic acid, 5-chlorofuran-2-carboxylic acid, 5-bromofuran-2-carboxylic acid, 5-iodofuran-2-carboxylic acid, 4,5-dibromo-2-furancarboxylic acid, 3,5-dibromo-2-furancarboxylic acid, 3-methyl-2-furancarboxylic acid, 2-methyl-3-furancarboxylic acid, 5-methyl-2-furancarboxylic acid, 2,4-dimethyl-3-furancarboxylic acid, 2,5-dimethyl-3-furancarboxylic acid, 5-phenyl-2-furancarboxylic acid, 5-(hydroxymethyl)furan-2-carboxylic acid, 5-benzyl-3-(hydroxymethyl)-2-furancarboxylic acid, 5-methoxymethyl-2-furancarboxylic acid, 2-ethoxymethyl-5-methyl-3-furancarboxylic acid, 5-(ethoxymethyl)-2-methyl-3-furancarboxylic acid, and 5-aminofuran-2-carboxylic acid.

Examples of the compound represented by the chemical formula (8) include 2-thenoic acid, 3-thenoic acid, 5-chlorothiophene-2-carboxylic acid, 5-bromothiophene-2-carboxylic acid, 5-iodothiophene-2-carboxylic acid, 3,5-dibromo-2-thiophenecarboxylic acid, 2,4,5-tribromo-3-thiophenecarboxylic acid, 3-hydroxy-2-thiophenecarboxylic acid, 4-hydroxy-2-thiophenecarboxylic acid, 3-methylthiophene-2-carboxylic acid, 4-methylthiophene-2-carboxylic acid, 5-methyl-3-thiophenecarboxylic acid, 5-methyl-2-thiophenecarboxylic acid, 5-phenylthiophene-2-carboxylic acid, 5-benzyl-2-thiophenecarboxylic acid, 4-benzyl-2-thiophenecarboxylic acid, 3-benzyl-2-thiophenecarboxylic acid, 3-methoxythiophene-2-carboxylic acid, 5-(methoxymethyl)-2-thiophenecarboxylic acid, and 5-amino-2-thiophenecarboxylic acid.

Examples of (e2) the metal salt of the aromatic carboxylic acid include a metal salt of the aromatic carboxylic acid having the benzene ring, a metal salt of the aromatic carboxylic acid having the fused benzene ring, and a metal salt of the aromatic carboxylic acid having the aromatic heterocycle. Examples of the metal cation of the aromatic carboxylic acid metal salt include a monovalent metal ion such as sodium, potassium, lithium or silver; a divalent metal ion such as magnesium, calcium, zinc, barium, cadmium, copper, cobalt, nickel or manganese; a trivalent metal ion such as aluminum or iron; and other metal ion such as tin, zirconium or titanium. As the cation component of the carboxylic acid salt, zinc ion is preferred. The cation component may be used solely or as a mixture of at least two of them.

The amount of (e2) the aromatic carboxylic acid and/or the metal salt thereof is preferably 1.0 part by mass or more, more preferably 2.0 parts by mass or more, even more preferably 2.5 parts by mass or more, and most preferably 3.0 parts by mass or more, and is preferably 40 parts by mass or less, more preferably 35 parts by mass or less, even more preferably 30 parts by mass or less, and most preferably 10 parts by mass or less, with respect to 100 parts by mass of (a) the base rubber. If the amount of (e) the aromatic carboxylic acid and/or the metal salt thereof is 1.0 part by mass or more, the effect of adding (e) the aromatic carboxylic acid and/or the metal salt thereof becomes greater, and the obtained spherical core has a greater degree of the outer-hard and inner-soft structure, and if the amount of (e) the aromatic carboxylic acid and/or the metal salt thereof is 40 parts by mass or less, the obtained spherical core has a better resilience because decrease in the hardness of the whole spherical core is suppressed.

A total of mole numbers of the carboxyl group and carboxylate group in the components (e1) and (e2) used in the rubber composition is preferably 0.010 or more, more preferably 0.020 or more, and even more preferably 0.030 or more, and is preferably 0.090 or less, more preferably 0.080 or less, and even more preferably 0.070 or less, with respect to 100 parts by mass of (a) the base rubber. If the total of mole numbers of the carboxyl group and carboxylate group in the components (e1) and (e2) falls within the above range, the obtained spherical core has a higher resilience.

A total of mole numbers of the carboxyl group and carboxylate group in the component (d) and the carboxyl group and carboxylate group in the components (e1) and (e2) used in the rubber composition is preferably 0.020 or more, more preferably 0.030 or more, and even more preferably 0.040 or more, and is preferably 0.10 or less, more preferably 0.090 or less, and even more preferably 0.080 or less, with respect to 100 parts by mass of (a) the base rubber. If the total of mole numbers of the carboxyl group and carboxylate group falls within the above range, the obtained spherical core has a higher resilience.

In the case that the rubber composition contains the component (e1) and/or the component (e2), a ratio ((component (d)+component (e1)+component (e2))/component (b)) of a total of mole numbers of carboxyl groups (—COOH) and carboxylate groups (—COO⁻) in the component (d), the component (e1) and the component (e2) to a total of mole numbers of carboxyl groups and carboxylate groups in the component (b) is preferably 0.01 or more, more preferably 0.02 or more, and even more preferably 0.03 or more, and is preferably 0.25 or less, more preferably 0.23 or less, and even more preferably 0.21 or less.

A ratio (component (d)/(component (e1)+component (e2))) of a total of mole numbers of carboxyl groups and carboxylate groups in the component (d) to a total of mole numbers of carboxyl groups and carboxylate groups in the component (e1) and the component (e2) is preferably 0.10 or more, more preferably 0.20 or more, and even more preferably 0.30 or more, and is preferably 2.4 or less, more preferably 2.2 or less, and even more preferably 2.0 or less. If the ratio (component (d)/(component (e1)+component (e2))) is 0.10 or more, the obtained spherical core has a better resilience, and if the ratio (component (d)/(component (e1)+component (e2))) is 2.4 or less, the obtained spherical core has appropriate flexibility.

[(f) Metal Compound]

In the case that the rubber composition used in the present invention contains only the α,β-unsaturated carboxylic acid having 3 to 8 carbon atoms as the co-crosslinking agent, the rubber composition further contains (f) a metal compound as an essential component. (f) The metal compound is not particularly limited as long as it can neutralize (b) the α,β-unsaturated carboxylic acid having 3 to 8 carbon atoms in the rubber composition. (f) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; and a metal carbonate such as magnesium carbonate, zinc carbonate, calcium carbonate, sodium carbonate, lithium carbonate, potassium carbonate, or the like. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with a higher resilience. (f) The metal compound may be used solely or as a mixture of at least two of them. The amount of (f) the metal compound may be appropriately determined in accordance with the desired neutralization degree of (b) the α,β-unsaturated carboxylic acid having 3 to 8 carbon atoms and (d) the unsaturated fatty acid.

The carboxyl group of the rubber composition preferably has a neutralization degree of 100 mole % or more, more preferably 105 mole % or more, even more preferably 108 mole % or more, and most preferably 110 mole % or more, and preferably has a neutralization degree of 300 mole % or less, more preferably 270 mole % or less, and even more preferably 250 mole % or less. If the neutralization degree is 100 mole % or more, the durability of the golf ball is maintained without changing the compression deformation amount of the core. On the other hand, if the neutralization degree is 300 mole % or less, the obtained spherical core does not become excessively soft, and thus the high resilience of the golf ball does not deteriorate. It is noted that the neutralization degree of the carboxyl group of the rubber composition is defined by the following mathematical formula.

Neutralization degree (mole %)=100×[Σ(mole number of cation component×valence of cation component)]/[Σ(mole number of anion component×valence of anion component)] [Mathematical formula 1]

In the mathematical formula 1, Σ(mole number of cation component× valence of cation component) is a sum of a product obtained by multiplying the mole number of the metal ion by the valence of the metal ion in the component (b), a product obtained by multiplying the mole number of the metal ion by the valence of the metal ion in the component (d), and a product obtained by multiplying the mole number of the metal ion by the valence of the metal ion in the component (f). It is noted that, when the rubber composition further contains the components (e1) and (e2), Σ(mole number of cation component x valence of cation component) further includes a product obtained by multiplying the mole number of the metal ion by the valence of the metal ion in the components (e1) and (e2).

In the mathematical formula 1, Σ(mole number of anion component x valence of anion component) is a sum of the mole number of the carboxyl group in the component (b) and the mole number of the carboxyl group in the component (d). It is noted that, when the rubber composition further contains the components (e1) and (e2), Σ(mole number of anion component x valence of anion component) further includes the mole number of the carboxyl group in the components (e1) and (e2).

[(g) Organic Sulfur Compound]

The rubber composition used in the present invention preferably contains (g) an organic sulfur compound. If the rubber composition contains (g) the organic sulfur compound, the spherical core has a higher resilience.

(g) The organic sulfur compound is not particularly limited, as long as it is an organic compound having a sulfur atom in the molecule thereof. Examples of (g) the organic sulfur compound include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I) or the like; and a divalent metal salt such as zinc, magnesium, calcium, strontium, barium, titanium (II), manganese (II), iron (II), cobalt (II), nickel (II), zirconium (II), tin (II) or the like. Furthermore, (g) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

(g) The organic sulfur compound includes thiols (thiophenols and thionaphthols), polysulfides, thiurams, thiocarboxylic acids, dithiocarboxylic acids, sulfenamides, dithiocarbamates, and thiazoles.

Examples of the thiols include, for example, thiophenols and thionaphthols. The thiophenols include, for example, thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, pentaiodothiophenol and the like; or a metal salt thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include, for example, the zinc salt of 1-thionaphthol and the zinc salt of 2-thionaphthol.

The polysulfides are organic sulfur compounds having a polysulfide bond, and include, for example, disulfides, trisulfides, and tetrasulfides. The polysulfides preferably include diphenylpolysulfides.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; and the like.

The thiurams include, for example, thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. The thiocarboxylic acids include, for example, a naphthalene thiocarboxylic acid. The dithiocarboxylic acids include, for example, a naphthalene dithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(g) The organic sulfur compound preferably includes thiophenols and/or the metal salt thereof, thionaphthols and/or the metal salt thereof, diphenyldisulfides, and thiuramdisulfides, more preferably includes 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl) disulfide.

(g) The organic sulfur compound may be used solely or in combination of at least two of them.

The amount of (g) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (g) the organic sulfur compound is less than 0.05 part by mass, the effect of adding (g) the organic sulfur compound is not obtained, and thus the resilience of the golf ball may not improve. In addition, if the amount of (g) the organic sulfur compound exceeds 5.0 parts by mass, the obtained golf ball has an excessively large compression deformation amount, and thus the resilience thereof may be lowered.

The rubber composition used in the present invention may further contain additives such as a pigment, a filler for adjusting a weight or the like, an antioxidant, a peptizing agent, a softening agent or the like, where necessary. The pigment blended into the rubber composition, for example, includes a white pigment, a blue pigment, a purple pigment or the like.

As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like. Zinc oxide is particularly preferably used as the filler. It is considered that zinc oxide functions as a vulcanization activator and increases the hardness of the entire spherical core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of the base rubber. If the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

The spherical core of the golf ball according to the present invention can be obtained by molding the kneaded rubber composition in a mold. The temperature for molding the spherical core is preferably 150° C.±10° C., and more preferably 150° C.±5° C. If the molding temperature is excessively high, the requirement that the hardness difference D2 (=Hs−H75) is −1 or more and 3.5 or less in Shore C hardness is not satisfied. In addition, if the molding temperature is excessively low, the requirement that the hardness difference D1 (=H75−H0) is 15 or more and 35 or less in Shore C hardness is not satisfied. The molding pressure preferably ranges from 2.9 MPa to 11.8 MPa. The molding time preferably ranges from 10 minutes to 60 minutes.

[Spherical Core]

The spherical core preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from an initial load of 98 N to a final load of 1275 N is preferably 1.90 mm or more, more preferably 2.00 mm or more, and even more preferably 2.10 mm or more, and is preferably 5.00 mm or less, more preferably 4.80 mm or less, and even more preferably 4.60 mm or less. If the compression deformation amount is 1.90 mm or more, the shot feeling of the golf ball becomes better. If the compression deformation amount is 5.00 mm or less, the resilience of the golf ball becomes better.

[Cover]

The cover of the golf ball of the present invention is formed from a cover composition containing a resin component. Examples of the resin component include, for example, an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation; and the like.

The ionomer resin includes, for example, a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture of those. The olefin preferably includes an olefin having 2 to 8 carbon atoms. Examples of the olefin include ethylene, propylene, butene, pentene, hexene, heptene, and octene. The olefin more preferably includes ethylene. Examples of the α,β-unsaturated carboxylic acid having 3 to 8 carbon atoms include acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred.

Among these, the ionomer resin preferably includes a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. the binary copolymerized ionomer resin such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer resin such as Himilan 1856 (Na), Himilan 1855 (Zn))" available from Du Pont-Mitsui Polychemicals Co., Ltd.

Further, examples of the ionomer resin also include "Surlyn (registered trademark) (e.g. the binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark) (e.g. the binary copolymerized ionomer resin such as Iotek 8000 (Na), Iotek 8030 (Na), Iotek 7010 (Zn), Iotek 7030 (Zn); and the ternary copolymerized ionomer resin such as Iotek 7510 (Zn), Iotek 7520 (Zn))" available from ExxonMobil Chemical Corporation.

It is noted that Na, Zn, Li, Mg or the like described in the parentheses after the trade name of the ionomer resin indicates a metal ion type for neutralizing the ionomer resin. The ionomer resin may be used solely or in combination of at least two of them.

The cover composition constituting the cover of the golf ball of the present invention preferably contains, as a resin component, a thermoplastic polyurethane elastomer or an ionomer resin. In case of using the ionomer resin, it is preferred to use a thermoplastic styrene elastomer together. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. Further, if the cover composition has a slab hardness of 20 or more, the abrasion resistance becomes better. In case of a plurality of cover layers, the slab hardness of the cover composition constituting each layer may be identical to or different from each other, as long as the slab hardness of each layer falls within the above range.

The method for molding the cover of the golf ball of the present invention, for example, includes a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 µm or more, more preferably 7 µm or more, and preferably has a thickness of 50 µm or less, more preferably 40 µm or less, even more preferably 30 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

[Golf Ball]

The golf ball construction of the present invention is not particularly limited, as long as the golf ball comprises a spherical core and at least one cover covering the spherical core. FIG. 1 is a partially cutaway sectional view showing a golf ball 1 according to an embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

The spherical core preferably has a single layered structure. Unlike the multi-layered structure, the spherical core of the single layered structure does not have energy loss at the interface of the multi-layered structure when being hit, and thus has a higher resilience. In addition, the cover has a structure of at least one layer, for example, a single layered structure, or a multi-layered structure of at least two layers. The golf ball of the present invention includes, for example, a two-piece golf ball comprising a spherical core and a single layered cover disposed around the spherical core; a multi-piece golf ball (including a three-piece golf ball) comprising a spherical core and at least two cover layers disposed around the spherical core; and a wound golf ball comprising a spherical core, a rubber thread layer which is formed around the spherical core, and a cover disposed over the rubber thread layer. The present invention can be suitably applied to any one of the above golf ball.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Core Hardness Distribution (Shore C Hardness)

A type P1 auto loading durometer manufactured by Kobunshi Keiki Co., Ltd., provided with a Shore C type spring hardness tester was used to measure the hardness of the core. The Shore C hardness measured at the surface of the core was adopted as the surface hardness of the core. In addition, the core was cut into two hemispheres to obtain a cut plane, and the hardness at the central point of the cut plane and the hardness at predetermined distances from the central point of the cut plane were measured. It is noted that the hardness of the core was measured at four points at predetermined distances from the central point of the core cut plane, and the average value thereof was adopted as the hardness of the core at the predetermined distance.

(3) Coefficient of Restitution

A metal cylindrical object with a mass of 198.4 g was allowed to collide with each core or golf ball at a speed of 40 m/sec, and the speeds of the cylindrical object and the core or golf ball before and after the collision were measured. Based on these speeds and the mass of each object, the coefficient of restitution of each core or golf ball was calculated. The measurement was conducted using twelve samples for each core or golf ball, and the average value thereof was adopted as the coefficient of restitution for that core or golf ball. It is noted that the coefficient of restitution in Tables 1 to 4 is shown as a difference from the coefficient of restitution of the golf ball No. 1.

(4) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(5) Flight Distance on Driver Shots

A W #1 driver provided with a metal head (XXIO S, loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) thereof was measured. The measurement was conducted twelve times for each golf ball, and the average value thereof was adopted as the measurement value for that golf ball. It is noted that the flight distance of each golf ball is shown as a difference from the flight distance of the golf ball No. 1 (flight distance difference=flight distance of each golf ball-flight distance of golf ball No. 1).

(6) Durability

A W #1 driver provided with a metal head (XXIO S, loft angel: 11°, available from Dunlop Sports Limited) was installed on a swing robot M/C available from Golf Laboratories, Inc. The golf ball was hit repeatedly at a head speed of 45 m/sec until a crack occurred, and the hitting times when the crack occurred were counted. The measurement was conducted using twelve samples for each golf ball, and the average value thereof was adopted as the hitting times for that golf ball. It is noted that the difference between the hitting times of each golf ball and the hitting times of the golf ball No. 1 (hitting times difference=hitting times of each golf ball-hitting times of golf ball No. 1) was calculated, and the durability was evaluated according to the following standard.

Evaluation Standard

G (Good): The hitting times difference is 0 or more.
P (Poor): The hitting times difference is less than 0.

[Production of Golf Ball]

(1) Production of Core

The rubber compositions having the formulations shown in Tables 1 to 7 were kneaded with a kneading roll, and heat pressed in upper and lower molds, each having a hemispherical cavity, at 150° C. for 20 minutes to obtain spherical cores having a diameter of 39.8 mm. It is noted that barium sulfate was added in an appropriate amount such that the obtained golf balls have a mass of 45.4 g.

TABLE 1

|  |  |  | Golf ball No. | | | |
|  |  |  | 1 | 2 | 3 | 4 |
| --- | --- | --- | --- | --- | --- | --- |
| Core rubber composition |  | BR730 | 100 | 100 | 100 | 100 |
|  |  | ZN-DA90S | 27 | 28 | 29 | 29 |
|  |  | Zinc oxide | 5 | 4 | 5 | 5 |
|  |  | PBDS | 0.3 | 0.3 | 0.3 | 0.3 |
|  |  | Dicumyl peroxide | 0.8 | 0.8 | 0.8 | 0.8 |
|  |  | Barium sulfate | *1) | *1) | *1) | *1) |
|  | d | Oleic acid (C18: 1) cis-9 (9) | — | 5.0 | 5.0 | 5.0 |
|  | e1 | Decanoic acid (C10: 0) | — | — | 4.9 | — |
|  |  | Myristic acid (C14: 0) | — | — | — | 6.5 |
|  |  | Stearic acid (C18: 0) | — | — | — | — |
|  |  | Zinc octanoate (C8) | — | — | — | — |
|  |  | Zinc decanoate (C10) | — | — | — | — |
|  |  | Zinc myristate (C14) | — | — | — | — |
|  |  | Zinc stearate (C18) | — | — | — | — |
|  | Ratio of total of mole numbers of carbon-carbon double bond (d)/(b) | | — | 0.07 | 0.07 | 0.07 |
| Hardness distribution (Shore C) | Center hardness H0 of core | | 53.8 | 52.3 | 46.1 | 47.8 |
|  | Hardness H12.5 at 12.5% point | | 60.2 | 58.5 | 50.2 | 52.0 |
|  | Hardness H25 at 25.0% point | | 62.7 | 61.5 | 55.5 | 57.2 |
|  | Hardness H37.5 at 37.5% point | | 63.3 | 62.4 | 58.1 | 59.9 |
|  | Hardness H50 at 50.0% point | | 63.5 | 62.8 | 59.5 | 61.2 |
|  | Hardness H62.5 at 62.5% point | | 66.9 | 66.7 | 67.7 | 67.6 |
|  | Hardness H75 at 75.0% point | | 73.3 | 72.5 | 75.5 | 75.4 |
|  | Surface hardness Hs of core | | 80.0 | 76.0 | 76.3 | 76.2 |
|  | Hs − H0 | | 26.2 | 23.7 | 30.2 | 28.4 |
|  | D1 = H75 − H0 | | 19.5 | 20.2 | 29.4 | 27.6 |
|  | D2 = Hs − H75 | | 6.7 | 3.5 | 0.8 | 0.8 |
|  | D2/D1 | | 0.34 | 0.17 | 0.03 | 0.03 |
|  | D3 = (H75 + H0)/2 − H37.5 | | 0.25 | 0.00 | 2.70 | 1.70 |
|  | D4 = H50 − H0 | | 9.7 | 10.5 | 13.4 | 13.4 |
|  | D5 = H75 − H50 | | 9.8 | 9.7 | 16.0 | 14.2 |

TABLE 1-continued

|  |  | Golf ball No. | | | |
| --- | --- | --- | --- | --- | --- |
|  |  | 1 | 2 | 3 | 4 |
| Core property | Compression deformation amount (mm) | 3.8 | 3.8 | 3.9 | 3.8 |
|  | Coefficient of restitution | 0.000 | 0.010 | 0.002 | 0.004 |
| Golf ball property | Compression deformation amount (mm) | 3.3 | 3.3 | 3.4 | 3.3 |
|  | Coefficient of restitution | 0.000 | 0.010 | 0.002 | 0.004 |
|  | Flight distance on driver shots (yd) | Control | 1.7 | 5.0 | 5.0 |
|  | Durability | G | G | G | G |

*1) Appropriate amount

TABLE 2

|  |  | Golf ball No. | | | | |
| --- | --- | --- | --- | --- | --- | --- |
|  |  | 5 | 6 | 7 | 8 | 9 |
| Core rubber composition |  BR730 | 100 | 100 | 100 | 100 | 100 |
|  | ZN-DA90S | 29 | 29 | 29 | 29 | 29 |
|  | Zinc oxide | 5 | 5 | 5 | 5 | 5 |
|  | PBDS | 0.3 | 0.3 | 0.3 | 0.3 | 0.3 |
|  | Dicumyl peroxide | 0.8 | 0.8 | 0.8 | 0.8 | 0.8 |
|  | Barium sulfate | *1) | *1) | *1) | *1) | *1) |
| d | Oleic acid (C18: 1) cis-9 (9) | 2.0 | 5.0 | 10.0 | 5.0 | 5.0 |
| e1 | Decanoic acid (C10: 0) | — | — | — | — | — |
|  | Myristic acid (C14: 0) | — | — | — | — | — |
|  | Stearic acid (C18: 0) | 10.0 | 10.0 | 10.0 | — | — |
|  | Zinc octanoate(C8) | — | — | — | 5.0 | — |
|  | Zinc decanoate(C10) | — | — | — | — | — |
|  | Zinc myristate (C14) | — | — | — | — | — |
|  | Zinc stearate (C18) | — | — | — | — | 10.0 |
|  | Ratio of total of mole numbers of carbon-carbon double bond (d)/(b) | 0.03 | 0.07 | 0.14 | 0.07 | 0.07 |
| Hardness distribution (Shore C) | Center hardness H0 of core | 50.0 | 49.3 | 48.6 | 44.8 | 49.7 |
|  | Hardness H12.5 at 12.5% point | 54.2 | 53.5 | 52.8 | 49.5 | 53.9 |
|  | Hardness H25 at 25.0% point | 59.4 | 58.7 | 58.0 | 54.0 | 59.1 |
|  | Hardness H37.5 at 37.5% point | 62.1 | 61.4 | 60.7 | 56.7 | 61.8 |
|  | Hardness H50 at 50.0% point | 63.4 | 62.7 | 62.7 | 58.7 | 63.1 |
|  | Hardness H62.5 at 62.5% point | 67.4 | 67.4 | 67.4 | 66.9 | 67.4 |
|  | Hardness H75 at 75.0% point | 75.2 | 75.2 | 75.2 | 75.9 | 75.2 |
|  | Surface hardness Hs of core | 77.5 | 76.0 | 75.0 | 77.3 | 76.0 |
|  | Hs − H0 | 26.4 | 26.4 | 26.4 | 32.5 | 26.3 |
|  | D1 = H75 − H0 | 25.2 | 25.9 | 26.6 | 31.1 | 25.5 |
|  | D2 = Hs − H75 | 2.3 | 0.8 | −0.2 | 1.4 | 0.8 |
|  | D2/D1 | 0.09 | 0.03 | −0.01 | 0.05 | 0.03 |
|  | D3 = (H75 + H0)/2 − H37.5 | 0.50 | 0.85 | 1.20 | 3.65 | 0.65 |
|  | D4 = H50 − H0 | 13.4 | 13.4 | 14.1 | 13.9 | 13.4 |
|  | D5 = H75 − H50 | 11.8 | 12.5 | 12.5 | 17.2 | 12.1 |
| Core property | Compression deformation amount (mm) | 3.7 | 3.7 | 3.7 | 3.8 | 3.7 |
|  | Coefficient of restitution | 0.005 | 0.005 | 0.003 | 0.005 | 0.005 |
| Golf ball property | Compression deformation amount (mm) | 3.2 | 3.2 | 3.2 | 3.3 | 3.2 |
|  | Coefficient of restitution | 0.005 | 0.005 | 0.003 | 0.002 | 0.005 |
|  | Flight distance on driver shots (yd) | 4.5 | 5.0 | 4.3 | 5.0 | 5.0 |
|  | Durability | G | G | G | G | G |

*1) Appropriate amount

TABLE 3

|  |  | Golf ball No. | | | |
| --- | --- | --- | --- | --- | --- |
|  |  | 10 | 11 | 12 | 13 |
| Core rubber composition | BR730 | 100 | 100 | 100 | 100 |
|  | ZN-DA90S | 30 | 30 | 36 | 30 |
|  | Zinc oxide | 5 | 5 | 5 | 5 |
|  | PBDS | 0.3 | 0.3 | 0.3 | 0.3 |
|  | Dicumyl peroxide | 0.8 | 0.8 | 0.8 | 0.8 |
|  | Barium sulfate | *1) | *1) | *1) | *1) |
| d | Oleic acid (C18: 1) cis-9 (9) | 5.0 | 5.0 | 5.0 | 5.0 |
| e2 | Benzoic acid | 3.0 | — | — | — |

TABLE 3-continued

|  |  | Golf ball No. | | | |
| --- | --- | --- | --- | --- | --- |
|  |  | 10 | 11 | 12 | 13 |
|  | Dimethyl aminobenzoic acid | — | 4.1 | — | — |
|  | Anisic acid | — | — | 3.7 | — |
|  | Chlorobenzoic acid | — | — | — | 3.8 |
|  | Acetoxybenzoic acid | — | — | — | — |
|  | 2,4-Dimethoxybenzoic acid | — | — | — | — |
|  | 2,4,5-Trimethoxybenzoic acid | — | — | — | — |
|  | 2,4,6-Trichlorobenzoic acid | — | — | — | — |
|  | 4-Tert-butylbenzoic acid | — | — | — | — |
|  | Ratio of total of mole numbers of carbon-carbon double bond (d)/(b) | 0.07 | 0.07 | 0.06 | 0.07 |
| Hardness distribution (Shore C) | Center hardness H0 of core | 45.7 | 46.1 | 52.0 | 48.1 |
|  | Hardness H12.5 at 12.5% point | 48.4 | 49.2 | 55.0 | 51.2 |
|  | Hardness H25 at 25.0% point | 51.9 | 53.2 | 59.0 | 55.2 |
|  | Hardness H37.5 at 37.5% point | 53.8 | 55.5 | 61.4 | 57.6 |
|  | Hardness H50 at 50.0% point | 55.6 | 56.4 | 62.3 | 58.4 |
|  | Hardness H62.5 at 62.5% point | 66.1 | 63.1 | 68.3 | 66.1 |
|  | Hardness H75 at 75.0% point | 74.2 | 69.8 | 74.3 | 73.8 |
|  | Surface hardness Hs of core | 73.5 | 69.5 | 75.0 | 73.5 |
|  | Hs − H0 | 27.8 | 23.4 | 23.0 | 25.4 |
|  | D1 = H75 − H0 | 28.5 | 23.7 | 22.3 | 25.7 |
|  | D2 = Hs − H75 | −0.7 | −0.3 | 0.7 | −0.3 |
|  | D2/D1 | −0.02 | −0.01 | 0.03 | −0.01 |
|  | D3 = (H75 + H0)/2 − H37.5 | 6.15 | 2.45 | 1.75 | 3.35 |
|  | D4 = H50 − H0 | 9.9 | 10.3 | 10.3 | 10.3 |
|  | D5 = H75 − H50 | 18.6 | 13.4 | 12.0 | 15.4 |
| Core property | Compression deformation amount (mm) | 4.1 | 4.5 | 4.2 | 4.0 |
|  | Coefficient of restitution | 0.010 | 0.000 | 0.005 | 0.002 |
| Golf ball property | Compression deformation amount (mm) | 3.6 | 4.0 | 3.7 | 3.5 |
|  | Coefficient of restitution | 0.010 | 0.000 | 0.005 | 0.002 |
|  | Flight distance on driver shots (yd) | 2.4 | 2.1 | 2.5 | 2.1 |
|  | Durability | G | G | G | G |

*1) Appropriate amount

TABLE 4

|  |  | Golf ball No. | | | | |
| --- | --- | --- | --- | --- | --- | --- |
|  |  | 14 | 15 | 16 | 17 | 18 |
| Core rubber composition | BR730 | 100 | 100 | 100 | 100 | 100 |
|  | ZN-DA90S | 30 | 32 | 32 | 34 | 30 |
|  | Zinc oxide | 5 | 5 | 5 | 5 | 5 |
|  | PBDS | 0.3 | 0.3 | 0.3 | 0.3 | 0.3 |
|  | Dicumyl peroxide | 0.8 | 0.8 | 0.8 | 0.8 | 0.8 |
|  | Barium sulfate | *1) | *1) | *1) | *1) | *1) |
| d | Oleic acid (C18: 1) cis-9 (9) | 5.0 | 5.0 | 5.0 | 5.0 | 5.0 |
| e2 | Benzoic acid | — | — | — | — | — |
|  | Dimethyl aminobenzoic acid | — | — | — | — | — |
|  | Anisic acid | — | — | — | — | — |
|  | Chlorobenzoic acid | — | — | — | — | — |
|  | Acetoxybenzoic acid | 4.4 | — | — | — | — |
|  | 2,4-Dimethoxybenzoic acid | — | 4.5 | — | — | — |
|  | 2,4,5-Trimethoxybenzoic acid | — | — | 5.2 | — | — |
|  | 2,4,6-Trichlorobenzoic acid | — | — | — | 5.5 | — |
|  | 4-Tert-butylbenzoic acid | — | — | — | — | 4.4 |
|  | Ratio of total of mole numbers of carbon-carbon double bond (d)/(b) | 0.07 | 0.06 | 0.06 | 0.06 | 0.07 |
| Hardness distribution (Shore C) | Center hardness H0 of core | 44.1 | 47.5 | 48.1 | 52.2 | 50.2 |
|  | Hardness H12.5 at 12.5% point | 47.1 | 50.5 | 51.2 | 55.2 | 53.2 |
|  | Hardness H25 at 25.0% point | 51.2 | 54.5 | 55.2 | 59.3 | 57.2 |
|  | Hardness H37.5 at 37.5% point | 53.5 | 56.9 | 57.6 | 61.6 | 59.6 |
|  | Hardness H50 at 50.0% point | 54.4 | 57.8 | 58.4 | 62.5 | 60.5 |
|  | Hardness H62.5 at 62.5% point | 62.6 | 65.3 | 66.1 | 67.6 | 67.1 |
|  | Hardness H75 at 75.0% point | 70.8 | 72.8 | 73.8 | 72.8 | 73.8 |
|  | Surface hardness Hs of core | 71.5 | 72.5 | 74.5 | 72.5 | 74.5 |
|  | Hs − H0 | 27.4 | 25.0 | 26.4 | 20.3 | 24.3 |
|  | D1 = H75 − H0 | 26.7 | 25.3 | 25.7 | 20.6 | 23.6 |
|  | D2 = Hs − H75 | 0.7 | −0.3 | 0.7 | −0.3 | 0.7 |
|  | D2/D1 | 0.03 | −0.01 | 0.03 | −0.01 | 0.03 |
|  | D3 = (H75 + H0)/2 − H37.5 | 3.95 | 3.25 | 3.35 | 0.90 | 2.40 |
|  | D4 = H50 − H0 | 10.3 | 10.3 | 10.3 | 10.3 | 10.3 |
|  | D5 = H75 − H50 | 16.4 | 15.0 | 15.4 | 10.3 | 13.3 |

TABLE 4-continued

|  |  | Golf ball No. | | | | |
|---|---|---|---|---|---|---|
|  |  | 14 | 15 | 16 | 17 | 18 |
| Core property | Compression deformation amount (mm) | 4.4 | 4.1 | 4.1 | 3.9 | 4.0 |
|  | Coefficient of restitution | 0.010 | 0.005 | 0.002 | 0.010 | 0.003 |
| Golf ball property | Compression deformation amount (mm) | 3.9 | 3.6 | 3.6 | 3.4 | 3.5 |
|  | Coefficient of restitution | 0.010 | 0.005 | 0.002 | 0.010 | 0.003 |
|  | Flight distance on driver shots (yd) | 2.4 | 2.3 | 2.0 | 2.7 | 3.0 |
|  | Durability | G | G | G | G | G |

*1) Appropriate amount

TABLE 5

|  |  |  | Golf ball No. | | | | |
|---|---|---|---|---|---|---|---|
|  |  |  | 19 | 20 | 21 | 22 | 23 |
| Core rubber composition |  | BR730 | 100 | 100 | 100 | 100 | 100 |
|  |  | ZN-DA90S | 27 | 27 | 27 | 27 | 27 |
|  |  | Zinc oxide | 5 | 5 | 5 | 5 | 5 |
|  |  | PBDS | 0.3 | 0.3 | 0.3 | 0.3 | 0.3 |
|  |  | Dicumyl peroxide | 0.8 | 0.8 | 0.8 | 0.8 | 0.8 |
|  |  | Barium sulfate | *1) | *1) | *1) | *1) | *1) |
|  | d | Oleic acid (C18: 1) cis-9 (9) | — | — | — | — | — |
|  | e1 | Decanoic acid (C10: 0) | 4.9 | — | — | — | — |
|  |  | Myristic acid (C14: 0) | — | 6.5 | — | — | — |
|  |  | Stearic acid (C18: 0) | — | — | 10.0 | — | — |
|  |  | Zinc octanoate(C8) | — | — | — | — | — |
|  |  | Zinc decanoate(C10) | — | — | — | — | — |
|  |  | Zinc myristate (C14) | — | — | — | — | — |
|  |  | Zinc stearate (C18) | — | — | — | — | 10.0 |
|  | Ratio | of total of mole numbers of carbon-carbon double bond (d)/(b) | — | — | — | — | — |
| Hardness distribution (Shore C) |  | Center hardness H0 of core | 47.5 | 49.2 | 50.7 | 46.2 | 51.1 |
|  |  | Hardness H12.5 at 12.5% point | 51.6 | 53.4 | 54.9 | 50.4 | 55.3 |
|  |  | Hardness H25 at 25.0% point | 56.9 | 58.6 | 60.1 | 55.6 | 60.5 |
|  |  | Hardness H37.5 at 37.5% point | 59.5 | 61.3 | 62.8 | 58.3 | 63.2 |
|  |  | Hardness H50 at 50.0% point | 60.9 | 62.6 | 64.1 | 59.6 | 64.5 |
|  |  | Hardness H62.5 at 62.5% point | 67.7 | 67.6 | 67.4 | 67.8 | 67.4 |
|  |  | Hardness H75 at 75.0% point | 75.5 | 75.4 | 75.2 | 75.6 | 75.2 |
|  |  | Surface hardness Hs of core | 79.3 | 79.2 | 79.0 | 79.4 | 79.0 |
|  |  | Hs − H0 | 31.8 | 30.0 | 28.3 | 33.2 | 27.9 |
|  |  | D1 = H75 − H0 | 28.0 | 26.2 | 24.5 | 29.4 | 24.1 |
|  |  | D2 = Hs − H75 | 3.8 | 3.8 | 3.8 | 3.8 | 3.8 |
|  |  | D2/D1 | 0.14 | 0.15 | 0.16 | 0.13 | 0.16 |
|  |  | D3 = (H75 + H0)/2 − H37.5 | 2.00 | 1.00 | 0.15 | 2.60 | −0.05 |
|  |  | D4 = H50 − H0 | 13.4 | 13.4 | 13.4 | 13.4 | 13.4 |
|  |  | D5 = H75 − H50 | 14.6 | 12.8 | 11.1 | 16.0 | 10.7 |
| Core property |  | Compression deformation amount (mm) | 3.9 | 3.8 | 3.7 | 3.9 | 3.7 |
|  |  | Coefficient of restitution | −0.001 | 0.001 | 0.002 | −0.002 | 0.002 |
| Golf ball property |  | Compression deformation amount (mm) | 3.4 | 3.3 | 3.2 | 3.4 | 3.2 |
|  |  | Coefficient of restitution | −0.001 | 0.001 | 0.002 | −0.002 | 0.002 |
|  |  | Flight distance on driver shots (yd) | 1.8 | 1.9 | 1.9 | 1.8 | 1.9 |
|  |  | Durability | G | G | G | G | G |

*1) Appropriate amount

TABLE 6

|  |  |  | Golf ball No. | | | |
|---|---|---|---|---|---|---|
|  |  |  | 24 | 25 | 26 | 27 |
| Core rubber composition |  | BR730 | 100 | 100 | 100 | 100 |
|  |  | ZN-DA90S | 30 | 30 | 36 | 30 |
|  |  | Zinc oxide | 5 | 5 | 5 | 5 |
|  |  | PBDS | 0.3 | 0.3 | 0.3 | 0.3 |
|  |  | Dicumyl peroxide | 0.8 | 0.8 | 0.8 | 0.8 |
|  |  | Barium sulfate | *1) | *1) | *1) | *1) |
|  | d | Oleic acid (C18: 1) cis-9 (9) | — | — | — | — |
|  | e2 | Benzoic acid | 3.0 | — | — | — |

TABLE 6-continued

|  |  | Golf ball No. | | | |
|---|---|---|---|---|---|
|  |  | 24 | 25 | 26 | 27 |
|  | Dimethyl aminobenzoic acid | — | 4.1 | — | — |
|  | Anisic acid | — | — | 3.7 | — |
|  | Chlorobenzoic acid | — | — | — | 3.8 |
|  | Acetoxybenzoic acid | — | — | — | — |
|  | 2,4-Dimethoxybenzoic acid | — | — | — | — |
|  | 2,4,5-Trimethoxybenzoic acid | — | — | — | — |
|  | 2,4,6-Trichlorobenzoic acid | — | — | — | — |
|  | 4-Tert-butylbenzoic acid | — | — | — | — |
|  | Ratio of total of mole numbers of carbon-carbon double bond (d)/(b) | — | — | — | — |
| Hardness distribution (Shore C) | Center hardness H0 of core | 44.8 | 46.1 | 52.0 | 48.1 |
|  | Hardness H12.5 at 12.5% point | 47.8 | 49.2 | 55.0 | 51.2 |
|  | Hardness H25 at 25.0% point | 51.8 | 53.2 | 59.0 | 55.2 |
|  | Hardness H37.5 at 37.5% point | 54.2 | 55.5 | 61.4 | 57.6 |
|  | Hardness H50 at 50.0% point | 55.1 | 56.4 | 62.3 | 58.4 |
|  | Hardness H62.5 at 62.5% point | 59.2 | 60.6 | 66.4 | 62.6 |
|  | Hardness H75 at 75.0% point | 74.8 | 69.8 | 74.3 | 73.8 |
|  | Surface hardness Hs of core | 84.4 | 79.4 | 83.9 | 83.4 |
|  | Hs − H0 | 39.6 | 33.3 | 31.9 | 35.3 |
|  | D1 = H75 − H0 | 30.0 | 23.7 | 22.3 | 25.7 |
|  | D2 = Hs − H75 | 9.6 | 9.6 | 9.6 | 9.6 |
|  | D2/D1 | 0.32 | 0.41 | 0.43 | 0.37 |
|  | D3 = (H75 + H0)/2 − H37.5 | 5.60 | 2.45 | 1.75 | 3.35 |
|  | D4 = H50 − H0 | 10.3 | 10.3 | 10.3 | 10.3 |
|  | D5 = H75 − H50 | 19.7 | 13.4 | 12.0 | 15.4 |
| Core property | Compression deformation amount (mm) | 4.0 | 4.4 | 4.1 | 3.9 |
|  | Coefficient of restitution | −0.002 | −0.012 | −0.007 | −0.010 |
| Golf ball property | Compression deformation amount (mm) | 3.5 | 3.9 | 3.6 | 3.4 |
|  | Coefficient of restitution | −0.002 | −0.012 | −0.007 | −0.010 |
|  | Flight distance on driver shots (yd) | 1.0 | 0.2 | 1.2 | 0.4 |
|  | Durability | G | G | G | G |

*1) Appropriate amount

TABLE 7

|  |  | Golf ball No. | | | | |
|---|---|---|---|---|---|---|
|  |  | 28 | 29 | 30 | 31 | 32 |
| Core rubber composition |  BR730 | 100 | 100 | 100 | 100 | 100 |
|  | ZN-DA90S | 30 | 32 | 32 | 34 | 30 |
|  | Zinc oxide | 5 | 5 | 5 | 5 | 5 |
|  | PBDS | 0.3 | 0.3 | 0.3 | 0.3 | 0.3 |
|  | Dicumyl peroxide | 0.8 | 0.8 | 0.8 | 0.8 | 0.8 |
|  | Barium sulfate | *1) | *1) | *1) | *1) | *1) |
| d | Oleic acid (C18: 1) cis-9 (9) | — | — | — | — | — |
| e2 | Benzoic acid | — | — | — | — | — |
|  | Dimethyl aminobenzoic acid | — | — | — | — | — |
|  | Anisic acid | — | — | — | — | — |
|  | Chlorobenzoic acid | — | — | — | — | — |
|  | Acetoxybenzoic acid | 4.4 | — | — | — | — |
|  | 2,4-Dimethoxybenzoic acid | — | 4.5 | — | — | — |
|  | 2,4,5-Trimethoxybenzoic acid | — | — | 5.2 | — | — |
|  | 2,4,6-Trichlorobenzoic acid | — | — | — | 5.5 | — |
|  | 4-Tert-butylbenzoic acid | — | — | — | — | 4.4 |
|  | Ratio of total of mole numbers of carbon-carbon double bond (d)/(b) | — | — | — | — | — |
| Hardness distribution (Shore C) | Center hardness H0 of core | 44.1 | 47.5 | 48.1 | 52.2 | 50.2 |
|  | Hardness H12.5 at 12.5% point | 47.1 | 50.5 | 51.2 | 55.2 | 53.2 |
|  | Hardness H25 at 25.0% point | 51.1 | 54.5 | 55.2 | 59.2 | 57.2 |
|  | Hardness H37.5 at 37.5% point | 53.5 | 56.9 | 57.6 | 61.6 | 59.6 |
|  | Hardness H50 at 50.0% point | 54.4 | 57.8 | 58.5 | 62.5 | 60.5 |
|  | Hardness H62.5 at 62.5% point | 58.5 | 61.9 | 62.6 | 66.6 | 64.6 |
|  | Hardness H75 at 75.0% point | 70.8 | 72.8 | 73.8 | 72.8 | 73.8 |
|  | Surface hardness Hs of core | 80.4 | 82.4 | 83.4 | 82.4 | 83.4 |
|  | Hs − H0 | 36.3 | 34.9 | 35.3 | 30.2 | 33.2 |
|  | D1 = H75 − H0 | 26.7 | 25.3 | 25.7 | 20.6 | 23.6 |
|  | D2 = Hs − H75 | 9.6 | 9.6 | 9.6 | 9.6 | 9.6 |
|  | D2/D1 | 0.36 | 0.38 | 0.37 | 0.47 | 0.41 |
|  | D3 = (H75 + H0)/2 − H37.5 | 3.95 | 3.25 | 3.35 | 0.90 | 2.40 |
|  | D4 = H50 − H0 | 10.3 | 10.3 | 10.4 | 10.3 | 10.3 |
|  | D5 = H75 − H50 | 16.4 | 15.0 | 15.3 | 10.3 | 13.3 |

TABLE 7-continued

|  |  | Golf ball No. | | | | |
| --- | --- | --- | --- | --- | --- | --- |
|  |  | 28 | 29 | 30 | 31 | 32 |
| Core property | Compression deformation amount (mm) | 4.3 | 4.0 | 4.0 | 3.8 | 3.9 |
|  | Coefficient of restitution | −0.002 | −0.007 | −0.010 | −0.002 | −0.009 |
| Golf ball property | Compression deformation amount (mm) | 3.8 | 3.5 | 3.5 | 3.3 | 3.4 |
|  | Coefficient of restitution | −0.002 | −0.007 | −0.010 | −0.002 | −0.009 |
|  | Flight distance on driver shots (yd) | 1.9 | 1.0 | 0.5 | 1.5 | 0.5 |
|  | Durability | G | G | G | G | G |

*1) Appropriate amount

The materials used in Tables 1 to 7 are shown below.

BR730: high-cis polybutadiene rubber (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation ZN-DA90S: zinc acrylate (containing zinc stearate in an amount of 10 mass %) available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

PBDS: bis(pentabromophenyl)disulfide available from Kawaguchi Chemical Industry Co., Ltd.

Barium sulfate: "Barium sulfate BD" available from Sakai Chemical Industry Co., Ltd.

Oleic acid: unsaturated fatty acid (C18, (9); in the chemical formula (2), $R^{11}$ has a carbon number of 8, $R^{12}$ has a carbon number of 7, carbon atom number of $R^{11}$/carbon atom number of $R^{12}$=1.1) available from Tokyo Chemical Industry Co., Ltd.

Decanoic acid: (with a purity of at least 98%) available from Tokyo Chemical Industry Co., Ltd.

Myristic acid: (with a purity of at least 98%) available from Tokyo Chemical Industry Co., Ltd.

Stearic acid: (with a purity of at least 98%) available from Tokyo Chemical Industry Co., Ltd.

Zinc octanoate: available from Mitsuwa Chemicals Co., Ltd.

Zinc decanoate: available from Mitsuwa Chemicals Co., Ltd.

Zinc myristate: (with a purity of at least 90%) available from NOF Corporation

Zinc stearate: (with a purity of at least 99%) available from Wako Pure Chemical Industries, Ltd.

Benzoic acid: (with a purity of at least 98%) available from Tokyo Chemical Industry Co., Ltd.

Dimethyl aminobenzoic acid: 4-dimethyl aminobenzoic acid (with a purity of at least 98%) available from Tokyo Chemical Industry Co., Ltd.

Anisic acid: p-anisic acid (4-methoxybenzoic acid, with a purity of at least 99%) available from Tokyo Chemical Industry Co., Ltd.

Chlorobenzoic acid: 4-chlorobenzoic acid (with a purity of at least 99%) available from Tokyo Chemical Industry Co., Ltd.

Acetoxybenzoic acid: 4-acetoxybenzoic acid (with a purity of at least 98%) available from Tokyo Chemical Industry Co., Ltd.

2,4-Dimethoxybenzoic acid: (with a purity of at least 99.0%) available from Tokyo Chemical Industry Co., Ltd.

2,4,5-Trimethoxybenzoic acid: (with a purity of at least 98.0%) available from Tokyo Chemical Industry Co., Ltd.

2,4,6-Trichlorobenzoic acid: (with a purity of at least 98.0%) available from Tokyo Chemical Industry Co., Ltd.

4-Tert-butylbenzoic acid: (with a purity of at least 99.0%) available from Tokyo Chemical Industry Co., Ltd.

(2) Production of Cover and Production of Golf Ball

Cover materials having the formulation shown in Table 8 were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover covering the spherical core. Evaluation results of the obtained golf balls are shown in Tables 1 to 7.

TABLE 8

| Cover composition | | |
| --- | --- | --- |
| Formulation (parts by mass) | Himilan 1605 | 50 |
|  | Himilan 1706 | 50 |
|  | Titanium oxide | 4 |
| Slab hardness (Shore D) |  | 65 |

The materials used in Table 8 are shown below.

Himilan 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

The inventive golf ball comprises a spherical core and at least one cover covering the spherical core, wherein a hardness difference D1 (H75−H0) between a hardness H75 at a point located at a distance of 75% of a core radius from a center of the spherical core and a center hardness H0 of the spherical core is 15 or more and 35 or less in Shore C hardness, a hardness difference D2 (Hs−H75) between a surface hardness Hs of the spherical core and the hardness H75 at the point located at the distance of 75% of the core radius from the center of the spherical core is −1 or more and 3.5 or less in Shore C hardness, and a hardness difference D3 ((H0+H75)/2−H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness. As shown in Tables 1-7, the spherical cores of the inventive golf balls have a high resilience, and these inventive golf balls show an excellent flight performance.

The golf ball according to the present invention has an excellent flight performance. This application is based on Japanese patent application No. 2016-216769 filed on Nov. 4, 2016, the content of which is hereby incorporated by reference.

The invention claimed is:

1. A golf ball comprising a spherical core and at least one cover covering the spherical core, wherein
  a hardness difference D1 (H75−H0) between a hardness H75 at a point located at a distance of 75% of a core radius from a center of the spherical core and a center hardness H0 of the spherical core is 15 or more and 35 or less in Shore C hardness,
  a hardness difference D2 (Hs−H75) between a surface hardness Hs of the spherical core and the hardness H75 at the point located at the distance of 75% of the core radius from the center of the spherical core is −1 or more and 3.5 or less in Shore C hardness,
  a hardness difference D3 ((H0+H75)/2−H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness, and
  a hardness difference D5 (H75−H50) between the hardness H75 at the point located at the distance of 75% of the core radius from the center of the spherical core and a hardness H50 at a point located at a distance of 50% of the core radius from the center of the spherical core is 10 or more in Shore C hardness.

2. The golf ball according to claim 1, wherein a ratio (D2/D1) of the hardness difference D2 to the hardness difference D1 is 0.3 or less.

3. The golf ball according to claim 1, wherein a hardness difference D4 (H50−H0) between a hardness H50 at a point located at a distance of 50% of the core radius from the center of the spherical core and the center hardness H0 of the spherical core is 9.5 or more in Shore C hardness.

4. The golf ball according to claim 1, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof excluding an α,β-unsaturated carboxylic acid having 3 to 8 carbon atoms and/or a metal salt thereof, and (e1) a saturated aliphatic carboxylic acid and/or a metal salt thereof and/or (e2) an aromatic carboxylic acid and/or a metal salt thereof.

5. The golf ball according to claim 4, wherein (d) the unsaturated fatty acid and/or the metal salt thereof is an unsaturated fatty acid having 4 to 33 carbon atoms and/or a metal salt thereof.

6. The golf ball according to claim 4, wherein (d) the unsaturated fatty acid and/or the metal salt thereof is an unsaturated fatty acid having one or two carbon-carbon double bonds and/or a metal salt thereof.

7. The golf ball according to claim 4, wherein (d) the unsaturated fatty acid and/or the metal salt thereof is a linear unsaturated fatty acid and/or a metal salt thereof.

8. The golf ball according to claim 4, wherein (d) the unsaturated fatty acid and/or the metal salt thereof is an unsaturated fatty acid represented by a chemical formula (1) and/or a metal salt thereof,

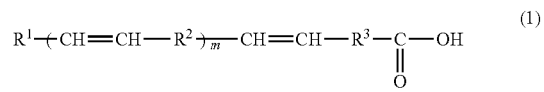

wherein $R^1$ represents a hydrogen atom or an alkyl group having 1 to 25 carbon atoms, $R^2$ represents an alkylene group having 1 to 25 carbon atoms, $R^3$ represents an alkylene group having 2 to 25 carbon atoms, and m represents a natural number ranging from 0 to 5, and when m ranges from 2 to 5, multiple $R^2$ may be identical to or different from each other.

9. The golf ball according to claim 4, wherein the rubber composition contains (d) the unsaturated fatty acid and/or the metal salt thereof in an amount ranging from 1 part by mass to 35 parts by mass with respect to 100 parts by mass of (a) the base rubber.

10. The golf ball according to claim 4, wherein the rubber composition contains (b) the metal salt of the α,β-unsaturated carboxylic acid having 3 to 8 carbon atoms as the co-crosslinking agent.

11. The golf ball according to claim 4, wherein the rubber composition has a neutralization degree of 100 mole % or more and 300 mole % or less.

12. The golf ball according to claim 4, wherein the rubber composition further contains (g) an organic sulfur compound.

13. The golf ball according to claim 12, wherein (g) the organic sulfur compound is at least one compound selected from the group consisting of thiophenols, diphenyldisulfides, thionaphthols, thiuramdisulfides, and metal salts thereof.

14. The golf ball according to claim 12, wherein the rubber composition contains (g) the organic sulfur compound in an amount of 0.05 part by mass to 5 parts by mass with respect to 100 parts by mass of (a) the base rubber.

15. The golf ball according to claim 4, wherein the rubber composition contains (b) the α,β-unsaturated carboxylic acid having 3 to 8 carbon atoms and/or the metal salt thereof in an amount ranging from 15 parts by mass to 50 parts by mass with respect to 100 parts by mass of (a) the base rubber.

16. The golf ball according to claim 4, wherein the rubber composition contains (e1) the saturated aliphatic carboxylic acid and/or the metal salt thereof, and/or (e2) the aromatic carboxylic acid and/or the metal salt thereof in a total amount ranging from 2 parts by mass to 40 parts by mass with respect to 100 parts by mass of (a) the base rubber.

17. The golf ball according to claim 4, wherein (e1) the saturated aliphatic carboxylic acid and/or the metal salt thereof is a saturated aliphatic carboxylic acid having 4 to 30 carbon atoms and/or a metal salt thereof.

18. A golf ball comprising a spherical core and at least one cover covering the spherical core, wherein
  a hardness difference D1 (H75−H0) between a hardness H75 at a point located at a distance of 75% of a core radius from a center of the spherical core and a center hardness H0 of the spherical core is 15 or more and 35 or less in Shore C hardness,
  a hardness difference D2 (Hs−H75) between a surface hardness Hs of the spherical core and the hardness H75 at the point located at the distance of 75% of the core radius from the center of the spherical core is −1 or more and 3.5 or less in Shore C hardness, and
  a hardness difference D3 ((H0+H75)/2−H37.5) between a hardness of (the center hardness H0 of the spherical core+the hardness H75 at the point located at the distance of 75% of the core radius from the center of the spherical core)/2 and a hardness H37.5 at a point located at a distance of 37.5% of the core radius from the center of the spherical core is 0.5 or more and 6.5 or less in Shore C hardness, and wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof excluding an α,β-unsaturated carboxylic acid having 3 to 8 carbon atoms and/or a metal salt thereof, and (e1) a saturated aliphatic carboxylic acid and/or a metal salt thereof and/or (e2) an aromatic carboxylic acid and/or a metal salt thereof.

* * * * *